United States Patent [19]
Ueda

[11] Patent Number: 5,145,112
[45] Date of Patent: Sep. 8, 1992

[54] AIR CONDITIONER

[75] Inventor: Matsuei Ueda, Aichi, Japan

[73] Assignee: Kabushiki Kaisha Toyota Chuo Kenkyusho, Aichi, Japan

[21] Appl. No.: 772,676

[22] Filed: Oct. 7, 1991

[30] Foreign Application Priority Data

Oct. 8, 1990 [JP] Japan .................................. 2-270874
Jul. 26, 1991 [JP] Japan .................................. 3-209832

[51] Int. Cl.$^5$ .............................................. F24F 7/00
[52] U.S. Cl. ...................................... 236/49.3; 62/186; 165/12; 395/61
[58] Field of Search ............... 62/186; 236/49.3, 91 C, 236/51; 165/12; 395/61, 900.

[56] References Cited

U.S. PATENT DOCUMENTS 4,857,106 8/1989 Wakimoto et al. ................ 395/61 X
5,025,499 6/1991 Inoue et al. ........................ 395/61 X

FOREIGN PATENT DOCUMENTS 0037642 3/1982 Japan ..................................... 236/51
1-229713 9/1989 Japan.

Primary Examiner—William E. Wayner
Attorney, Agent, or Firm—Oblon, Spivak, McClelland, Maier & Neustadt

[57] ABSTRACT

An air conditioner includes: a skin temperature sensor for collecting information about the temperature sensation of a person inside a room or compartment; a temperature sensation-estimating computer for estimating the temperature sensation from the hysteresis of the information provided by the skin temperature sensor within a given period; a control pattern storage computer in which a predetermined control pattern for reaching a desired temperature sensation is stored; a correction amount-determining computer for determining amounts of corrections of the flow rate and the temperature of air blown into the room or compartment in such a way that the control pattern stored in the storage computer agrees with the temperature sensation estimated by the temperature sensation-estimating computer; a conditioning air temperature control computer for controlling the temperature of the air according to the output signal from the correction amount-determining computer; and a blower for controlling the flow rate of the air according to the output signal from the correction amount-determining computer. The temperature sensation is accurately estimated according to the hysteresis of the information about the temperature sensation, and the room or compartment is air-conditioned according to the estimated sensation.

20 Claims, 35 Drawing Sheets

AIR CONDITIONER

BACKGROUND OF THE INVENTION

1. Field of the Invention

The present invention relates to an air conditioner and, more particularly, to an air conditioner adapted to air-condition a room or a passenger compartment of a vehicle.

2. Description of the Related Art

In a known air conditioner of this kind such as disclosed in Japanese Patent Laid-Open No. 229713/1989, the temperature sensation of the passenger in a vehicle is estimated only from the present temperature of the skin of the passenger, and then the passenger compartment is air-conditioned according to the estimated temperature sensation.

In this known air conditioner, it is assumed that the temperature of the skin of the passenger has a linear relation to the temperature sensation. The temperature of the skin is linearly transformed to estimate the temperature sensation of the passenger. Therefore, if the temperature of the skin that is information about the temperature sensation lies in a region where a linear relationship is held between the temperature of the skin and the temperature sensation, then no problems take place. However, if the temperature is outside this region as encountered when the sun suddenly becomes fiercer or lesser, i.e., the ambient condition changes suddenly, then the temperature sensation actually felt by the passenger fails to correspond to the estimated temperature sensation. As a result, the passenger compartment is inadequately air-conditioned. If a more violent temperature change occurs, then the effects of this violent change may linger on the temperature sensation. In the prior art techniques, the temperature sensation is estimated, taking account of only the present skin temperature. Consequently, the lingering effects or aftereffect cannot be taken into consideration.

SUMMARY OF THE INVENTION

In view of the foregoing problems with the prior art techniques, it is an object of the present invention to provide an air conditioner which has a temperature sensation information-collecting means acting to collect information about the temperature sensation of a person inside a room or compartment and to provide the information about the temperature sensation and which estimates the present temperature sensation according to the past history (hereinafter referred to as the hysteresis) of the information within a given period to accurately estimate the temperature sensation actually felt by the passenger even if the ambient condition varies suddenly, thereby maintaining the temperature sensation comfortable.

The above object is achieved in accordance with the teachings of the invention by an air conditioner comprising: temperature sensation information-collecting means for collecting information about a temperature sensation of a person inside a room or compartment; temperature sensation-estimating means for estimating a temperature sensation from the hysteresis of the information provided by the temperature sensation information-collecting means within a given period; control pattern storage means in which a predetermined control pattern for reaching a desired temperature sensation is stored; correction amount-determining means for determining amounts of corrections of the flow rate and the temperature of air blown into the room or compartment in such a way that the control pattern stored in the storage means agrees with the temperature sensation estimated by the temperature sensation-estimating means; conditioning air temperature control means for controlling the temperature of the air blown into the room or compartment according to the output signal from the correction amount-determining means; and a blower for controlling the flow rate of the air blown into the room or compartment according to the output signal from the correction amount-determining means.

In the air conditioner fabricated in this way, information about the temperature sensation of the person inside the room or compartment is collected by the temperature sensation information-collecting means. The temperature sensation-estimating means estimates the temperature sensation from the hysteresis of the information provided by the temperature sensation information-collecting means within a given period. Then, in order to reach desired temperature sensation while maintaining comfortable condition, the correction amount-determining means determines amounts of corrections such as the flow rate and the temperature of air blown into the room or compartment in such a way that the predetermined control pattern stored in the storage means agrees with the temperature sensation estimated by the temperature sensation-estimating means. The conditioning air temperature control means controls the temperature of the air blown into the room or compartment according to the output signal from the correction amount-determining means. The blower controls the flow rate of the air blown into the room or compartment according to the output signal from the correction amount-determining means. The temperature of this air is controlled by the conditioning air temperature control means.

The temperature sensation-estimating means can be designed in the manner described below. This estimating means uses information about the temperature sensation collected by the temperature sensation information-collecting means within a given period starting with a reference instant of time. The estimating means also employs the output value indicating the temperature sensation at the reference instant. The estimating means multiplies the information about the temperature sensation by previously adjusted weighting coefficients, and the resulting products are summed up in such a way that the input information about the temperature sensation corresponds to the output value indicating the temperature sensation. An output signal indicating the calculated total amount is produced. The estimating means can take the form of an arithmetic unit composed of a number of arithmetic elements which subject this output signal to a nonlinear transformation and produce an output signal. In estimating the temperature sensation, the arithmetic unit multiplies the information about the temperature sensation provided from the temperature sensation information-collecting means within a given period by the adjusted weighting coefficients. The resulting products are added up. The total amount is subjected to a nonlinear transformation, resulting in a final output value. The temperature sensation is estimated from this final output value. The novel air conditioner can cope with nonlinear information processing, since the nonlinear transformation is made during the transformation of the information.

In the air conditioner according to the invention, information about the temperature sensation of a person inside the room or compartment is collected by the temperature sensation-collecting means. Then, the temperature sensation-estimating means estimates the temperature sensation according to the hysteresis of the information about the temperature sensation, the information being provided by the collecting means within a given period. Therefore, the lingering effects or aftereffect of a sudden temperature change can be taken into account. Consequently, a control pattern for desired temperature sensation can be precisely accomplished.

Other objects and features of the invention will appear in the course of the description thereof which follows.

DETAILED DESCRIPTION OF THE INVENTION

EXAMPLE 1

Figure 1:
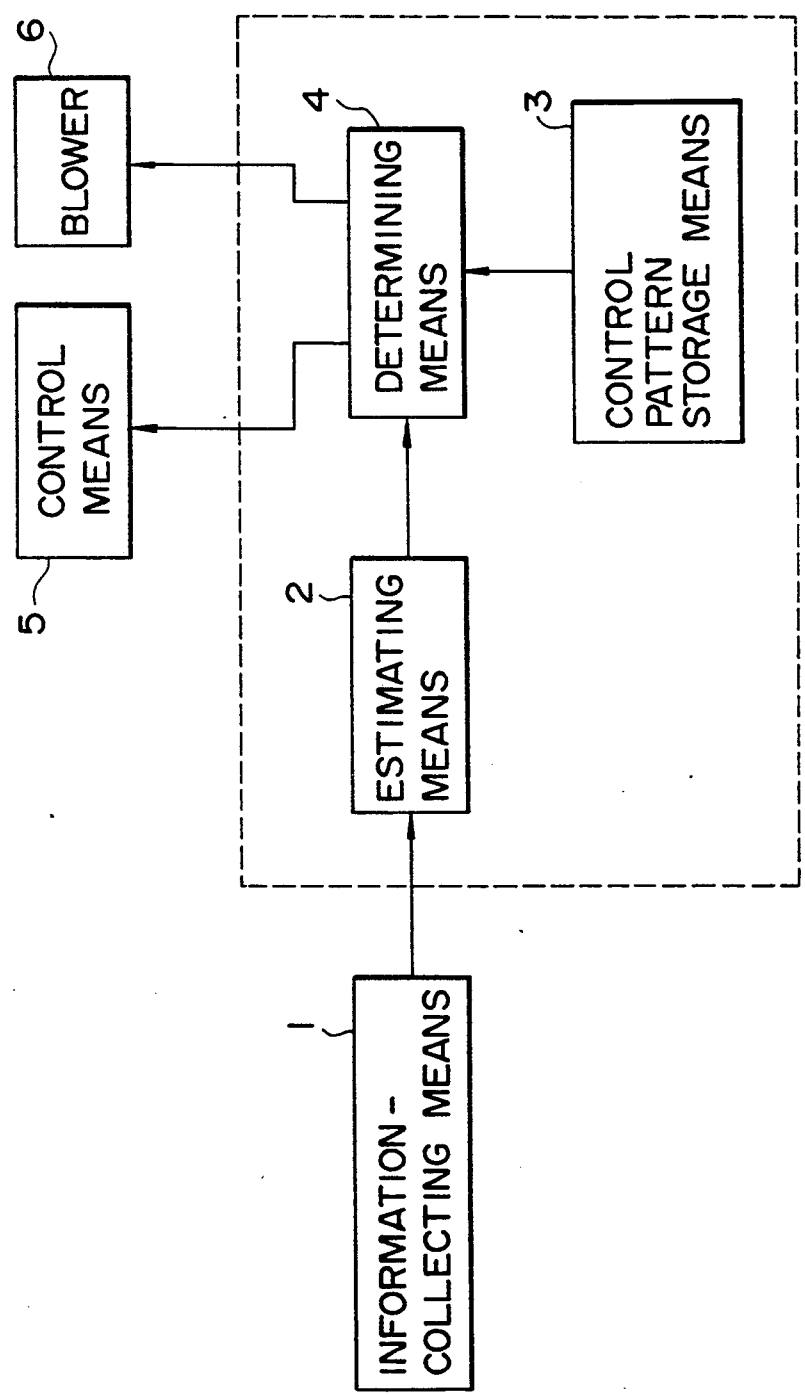
FIG. 1 is a block diagram of an air conditioner of Example 1 of the invention.
Figure 12:
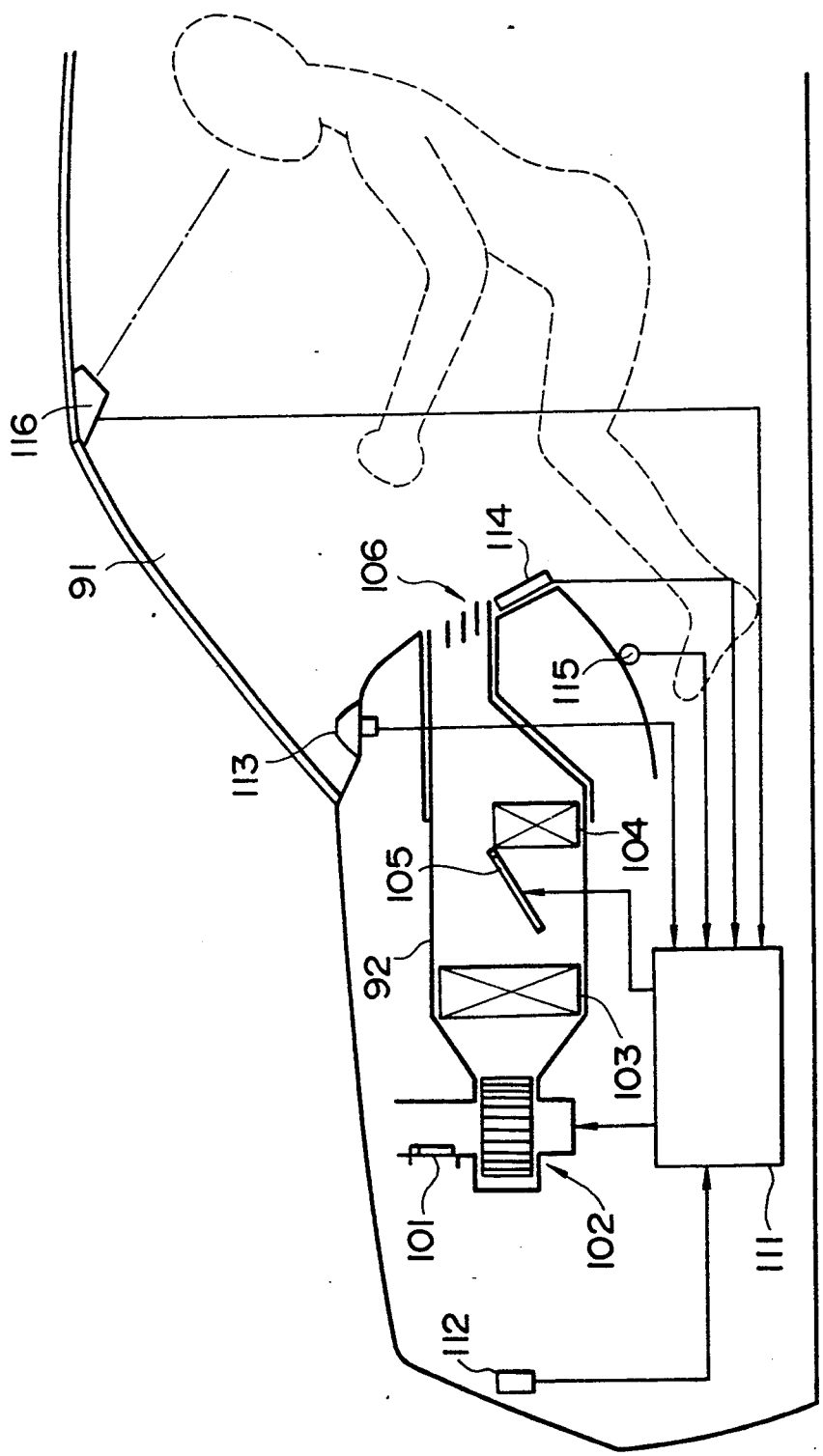
FIG. 12 is a fragmentary pictorial cross section of an automobile equipped with an air conditioner according to the invention.

Example 1 of the present invention is next described by referring to FIG. 12. An infrared thermometer 116 consists of an infrared sensor which detects the temperature of the skin of the passenger from his or her face without contacting it. This thermometer forms a temperature sensation information-collecting means. A control unit 111 which controls an air-conditioning unit 92 is composed of the components surrounded by the broken line in FIG. 1. Referring also to FIG. 1, these components are a control pattern storage means 3, a correction amount-determining means 4, and a temperature sensation-estimating means 2. These means consist of a microcomputer. The temperature sensation-estimating means 2 comprises a storage portion and a neural net. The output signal from the thermometer 116 is stored in the storage portion at discrete instants of time. The neural net reads data from the storage portion to estimate the present temperature sensation of the passenger.

Figure 2:
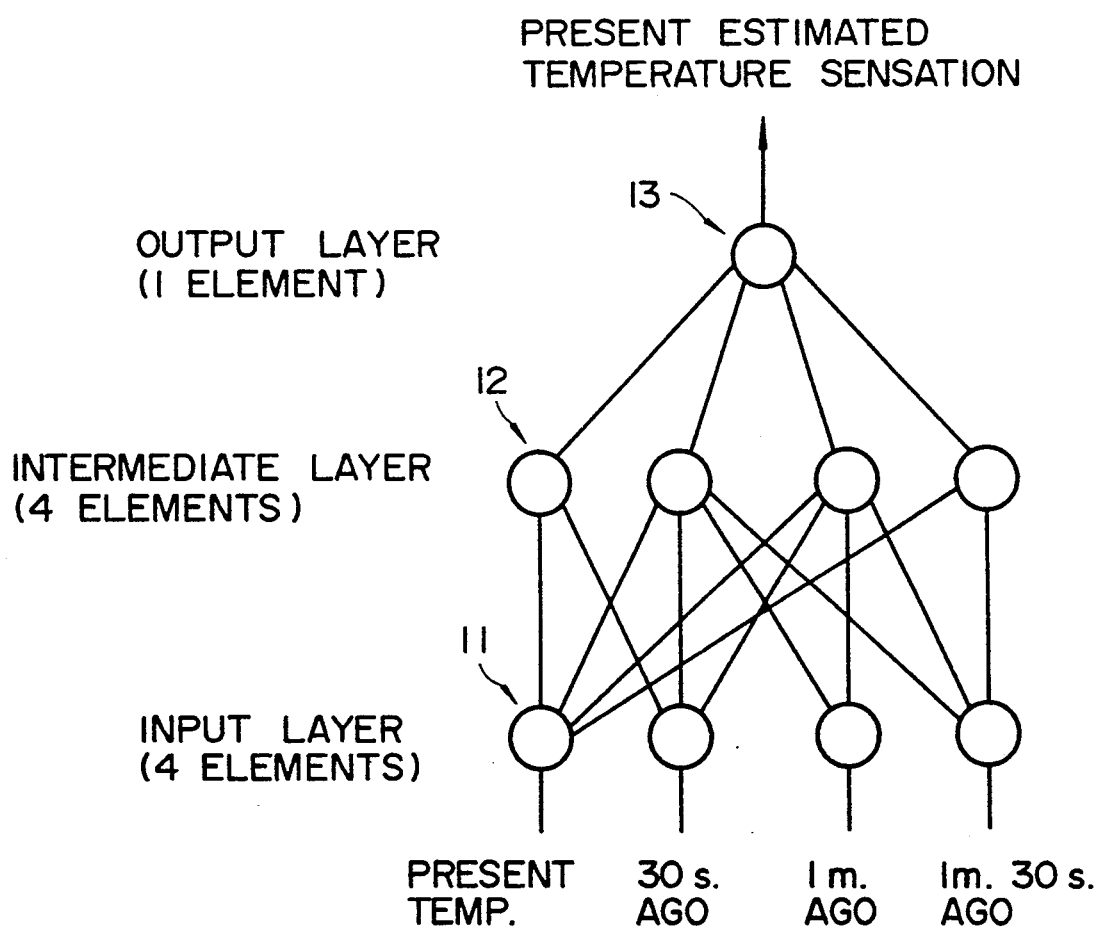
FIG. 2 is a diagram illustrating the structure of the temperature sensation-estimating means of Example 1 of the invention.

The neural net of the temperature sensation estimating means 2 is shown in FIG. 2 and estimates temperature sensation. Skin temperatures detected every 30 seconds for past several minutes, in this example for 1 minute and 30 seconds, are applied to the input layer of this neural net, together with the present skin temperature.

Figure 3A:
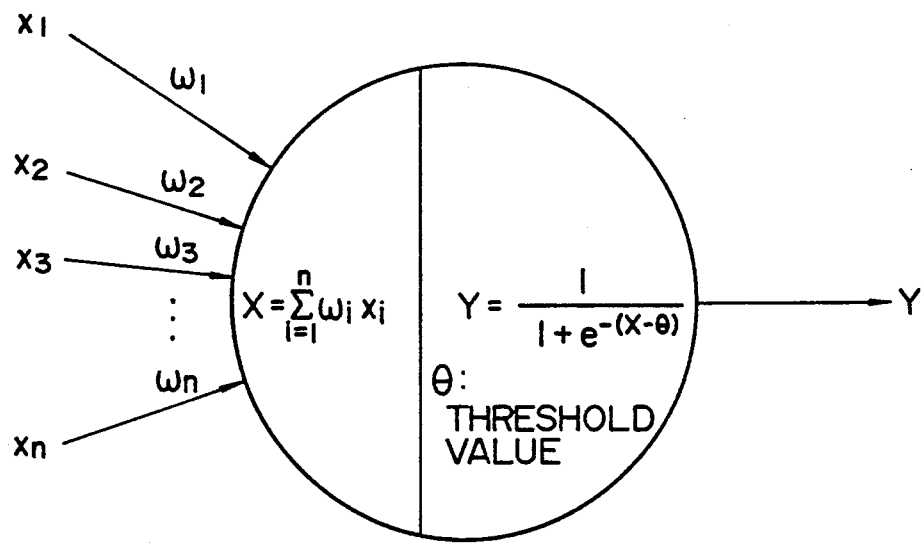
FIG. 3(a) is a diagram illustrating the relation of the inputs to each element of the temperature sensation-estimating means of Example 1 of the invention to the output from the element.
Figure 3B:
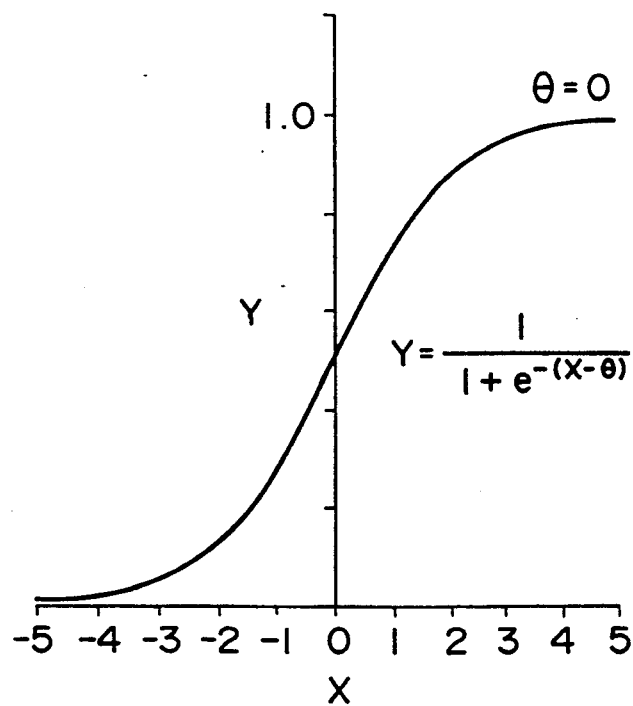
FIG. 3(b) is a graph showing the characteristics of each element of the temperature sensation-estimating means of Example 1 of the invention.

The neural net which constitutes the temperature sensation-estimating means in the present example comprises the input layer, indicated by 11, an intermediate layer 12, and an output layer 13. That is, the neural net is composed of three layers. The input layer 11 consists of 4 elements. The intermediate layer 12 consists of 4 elements. The output layer 13 consists of one element. As shown in FIG. 3, the output of each element has a nonlinear relation to the inputs. This relation is given by $$X = \Sigma w_i x_i$$

$$Y = 1 / (1 + exp(-(X-\theta)))$$

where xi is the value applied to each element from the previous stage of layer, wi is the weight of the coupling between elements, and $\theta$ is the threshold value for each element. $\Sigma$ means totaling all the input values xi. However, only for the input layer 11 of FIG. 2, all the elements change identically while maintaining the relation Y=X.

The output layer 13 shown in FIG. 2 produces a value corresponding to the present temperature sensation of the passenger. The threshold value for each element of the neural net that estimates the temperature sensation and the weights of the couplings between the elements are determined by previous education. Specifically, examinations are made on several subjects including men and women in variously air-conditioned states. The skin temperatures and the temperature sensations are collected as educational data. The threshold values and the weights are calculated, based on the educational data, in the manner as illustrated in the flowchart of FIG. 4.

Figure 4:
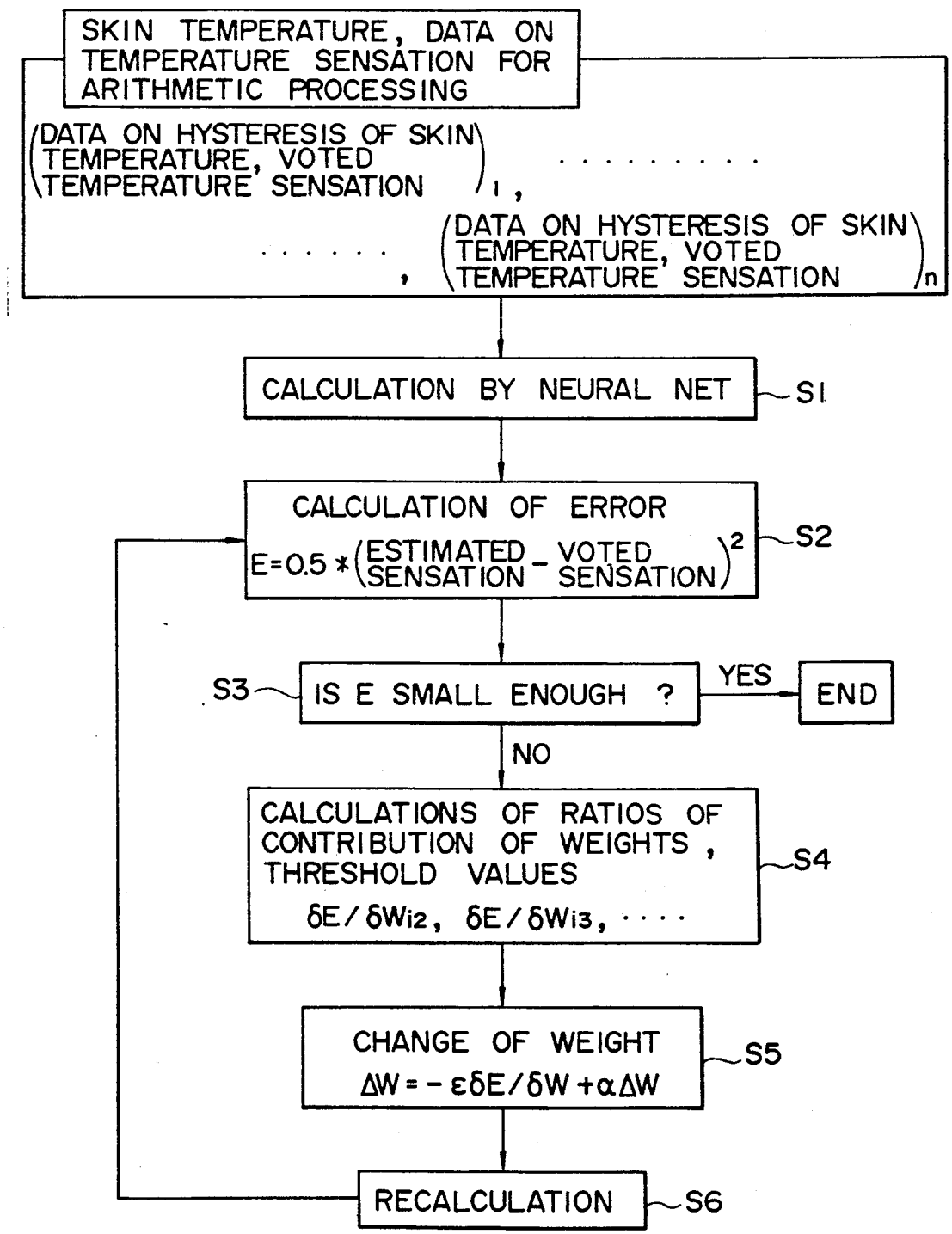
FIG. 4 is a flowchart illustrating a series of operations performed by the temperature sensation-estimating means of Example 1 of the invention to make adjustments.

In step 1 of FIG. 4, data about the hysteresis of skin temperature is entered from the input layer, the data being contained in the educational data. First, random numbers are given to the threshold values for each element and to the weights of the couplings between the elements. Under this condition, calculation is made to proceed to the intermediate layer 12 and then to the output layer 13, for estimating the temperature sensation by calculation.

In step 2, the difference, or error E, between the temperature sensation Y calculated in step 1 and the temperature sensation D actually voted by the examinee is calculated from the equation $$E = 0.5 * (Y-D)^2$$

In step 3, if the error calculated in step 2 is sufficiently small, then the weights and the threshold values are stored in the memory, and the process is ended. If the error is large, the amount of correction made to each weight is calculated in step 4 and the subsequent steps.

In step 4, the amount of correction made to each weight and the amount of correction made to each threshold value are computed in accordance with the formula $$\partial E / \partial Y = Y - D$$

The amount of correction made to the threshold value for the output layer 13 is given by $$\begin{aligned} \partial E/\partial \theta &= \partial E/\partial Y \cdot \partial Y/\partial X \cdot \partial X/\partial \theta \\ &= -\partial E/\partial Y \cdot Y(1-Y) \end{aligned}$$

Then, $$\begin{aligned} \partial E/\partial X &= \partial E/\partial Y \cdot \partial Y/\partial X \\ &= \partial E/\partial Y \cdot Y(1-Y) \end{aligned}$$

The amount of correction made to the weight (wiOUT) of the coupling between the i-th element in the intermediate layer 12 and the output layer 13 is given by $$\begin{aligned} \partial E/\partial w_i\text{OUT} &= \partial E/\partial X \cdot \partial X/\partial w_i\text{OUT} \\ &= \partial E/\partial X \cdot y_i \end{aligned}$$

where yi is the i-th output value from the intermediate layer 12. The ratio of the contribution of the i-th output value yi from the intermediate layer 12 to the error is given by $$\begin{aligned} \partial E/\partial y_i &= \partial E/\partial X \cdot \partial X/\partial y_i \\ &= \partial E/\partial X \cdot w_i\text{OUT} \end{aligned}$$

The ratio of the contribution of the threshold value $\theta i$ for the i-th element of the intermediate layer 12 to the error is given by $$\begin{aligned} \partial E/\partial \theta_i &= \partial E/\partial y_i \cdot \partial y_i/\partial x_i \cdot \partial x_i/\partial \theta_i \\ &= -\partial E/\partial y_i \cdot y_i(1-y_i) \end{aligned}$$

Letting xi be the value applied to the i-th element of the intermediate layer 12, we have $$\begin{aligned} \partial E/\partial x_i &= \partial E/\partial y_i \cdot \partial y_i/\partial x_i \\ &= \partial E/\partial y_i \cdot y_i(1-y_i) \end{aligned}$$

The ratio of the contribution of the weight wij of the coupling between the j-th element of the input layer 11 and the i-th element of the intermediate layer 12 to the error is given by $$\begin{aligned} \partial E/\partial w_{ij} &= \partial E/\partial x_i \cdot \partial x_i/\partial w_{ij} \\ &= \partial E/\partial x_i \cdot y_j' \end{aligned}$$

where yj' is the j-th output from the input layer 11. The amount of correction made to the threshold value for each element and the amounts of correction made to the weights of the couplings between the elements are calculated according to the above formulas.

In step 5, the amount of correction is calculated, using ∂E/∂w, ∂E/∂θ, etc. calculated in step 4, and from the equation $$\Delta w(t) = -\gamma \cdot \partial E/\partial w + \alpha \cdot \Delta w\ (t-1)$$

where Δw(t−1) is the amount of correction made previously, and γ, α are constants. In practice, the weight is corrected according to the formula $$w = w + \Delta w$$

In step 6, after the correction made in step 5, calculations similar to those performed in step 1 are carried out, and then control goes back to step 2.

These steps 1-6 are repeated. The weights and the threshold values which provide a sufficiently small error are set into the neutral net that is used for estimation of the temperature sensation.

Figure 5A:
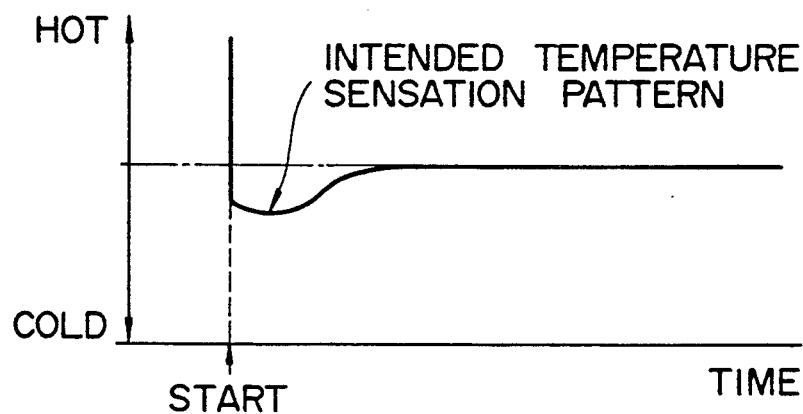
FIG. 5(a) is a diagram showing one example of temperature sensation control pattern used in Examples 1 and 5 of the invention.
Figure 5B:
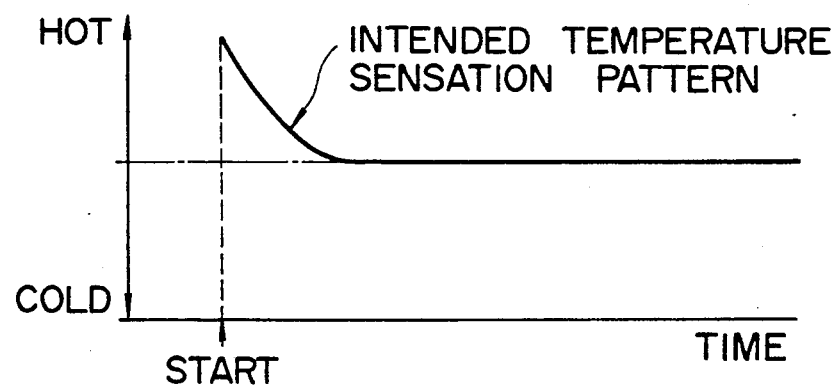
FIG. 5(b) is a diagram showing another example of temperature sensation control pattern used in Examples 1 and 5 of the invention.

The control pattern storage means 3 shown in FIG. 1 serves to previously determine the pattern in which the intended temperature sensation varies with time. For example, as shown in FIG. 5(a), a slightly cold condition is established. Then, the temperature is so controlled that the person feels neither hot nor cold. Another pattern is shown in FIG. 5(b), where a moderate condition is gradually approached. In the pattern shown in FIG. 5(c), a moderate condition is maintained from the first. Similarly, when heating is needed, several patterns are possible.

Figure 5C:
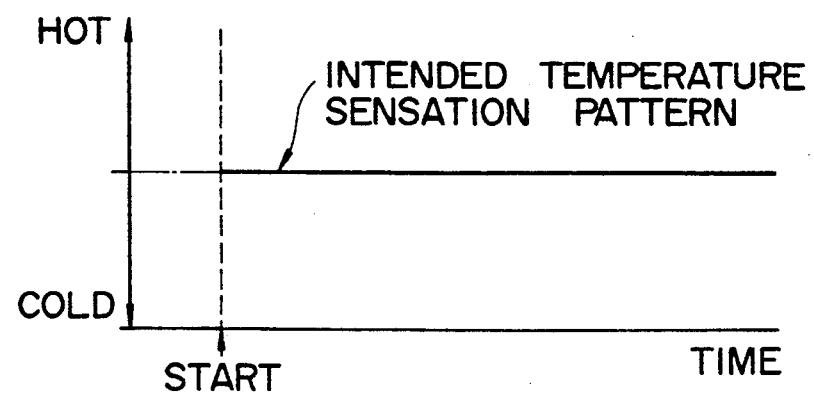
FIG. 5(c) is a diagram showing a further example of temperature sensation control pattern used in Examples 1 and 5 of the invention.

In this Example 1, the pattern shown in FIG. 5(c) is utilized, i.e., a moderate condition is maintained from the first. Other temperature control patterns including the above-described patterns may also be used. Also, it is possible to store several kinds of control pattern in the control pattern storage means and to select the optimum one out of the stored patterns according to the passenger's desire.

The correction amount-determining means 4 calculates the difference between the temperature sensation estimated by the temperature sensation-estimating means and the temperature sensation found from the temperature control pattern previously stored in the control pattern storage means 3. Then, the amount of correction made to the temperature of the blown air and the amount of correction made to the speed of the air are calculated from the difference. As shown in FIG. 12, the air-conditioning unit 92 has the conventional structure, and comprises an interior air/outside air switching device 101, a blower 102, an evaporator 103, a heater core 104, an air mix damper 105, and a vent hole 106.

An air-conditioning control means 5 responds to the amounts of corrections supplied from the correction amount-determining means 4 and controls the temperature of the conditioning air blown into the passenger compartment 91, through the evaporator 103, the heater core 104, and the air mix damper 105. The blower 102 is a winged air blower having numerous wings on its outer periphery. This blower 102 is mounted near the air intake port in the air-conditioning unit 92. The blower 102 acts to blow air into the passenger compartment 91 at a flow rate determined by the correction amount-determining means 4, the temperature of the air being adjusted by the air-conditioning control means 5.

The operation of this Example 1 is described next. The temperature sensation information-collecting means 1 consisting of the infrared thermometer collects information about the temperature sensation of the passenger. For example, the thermometer measures the temperature of the skin of the driver's face every 30 seconds. The temperature sensation-estimating means 2 is applied with the measured temperature of the passenger's skin. The hysteresis of the skin temperatures measured every 30 seconds for 1 minute and 30 seconds up to now is applied to the temperature sensation-estimating means 2 consisting of the neural net, which then estimates the temperature sensation. The correction amount-determining means 4 compares the estimated temperature sensation with the temperature sensation previously stored in the control pattern storage means 3. The difference is calculated. If the estimated temperature sensation is colder than moderate temperature sensation, and if the weather needs heating, then the heater output is increased. If the weather needs cooling, then the cooler output is lowered. In this way, the amount of correction is transmitted to the air-conditioning control means 5. It is to be noted that since only a small amount of data about the skin temperature is available at the beginning of the air conditioning, the accuracy at which the temperature sensation is estimated is low. Therefore, the temperature of the passenger compartment is retained at 25° C. for 1 minute and 30 seconds since the beginning of the air conditioning, i.e., until a sufficient amount of data is obtained for the temperature sensation-estimating means. Thereafter, the temperature is controlled by the temperature sensation-estimating means.

Figure 20:
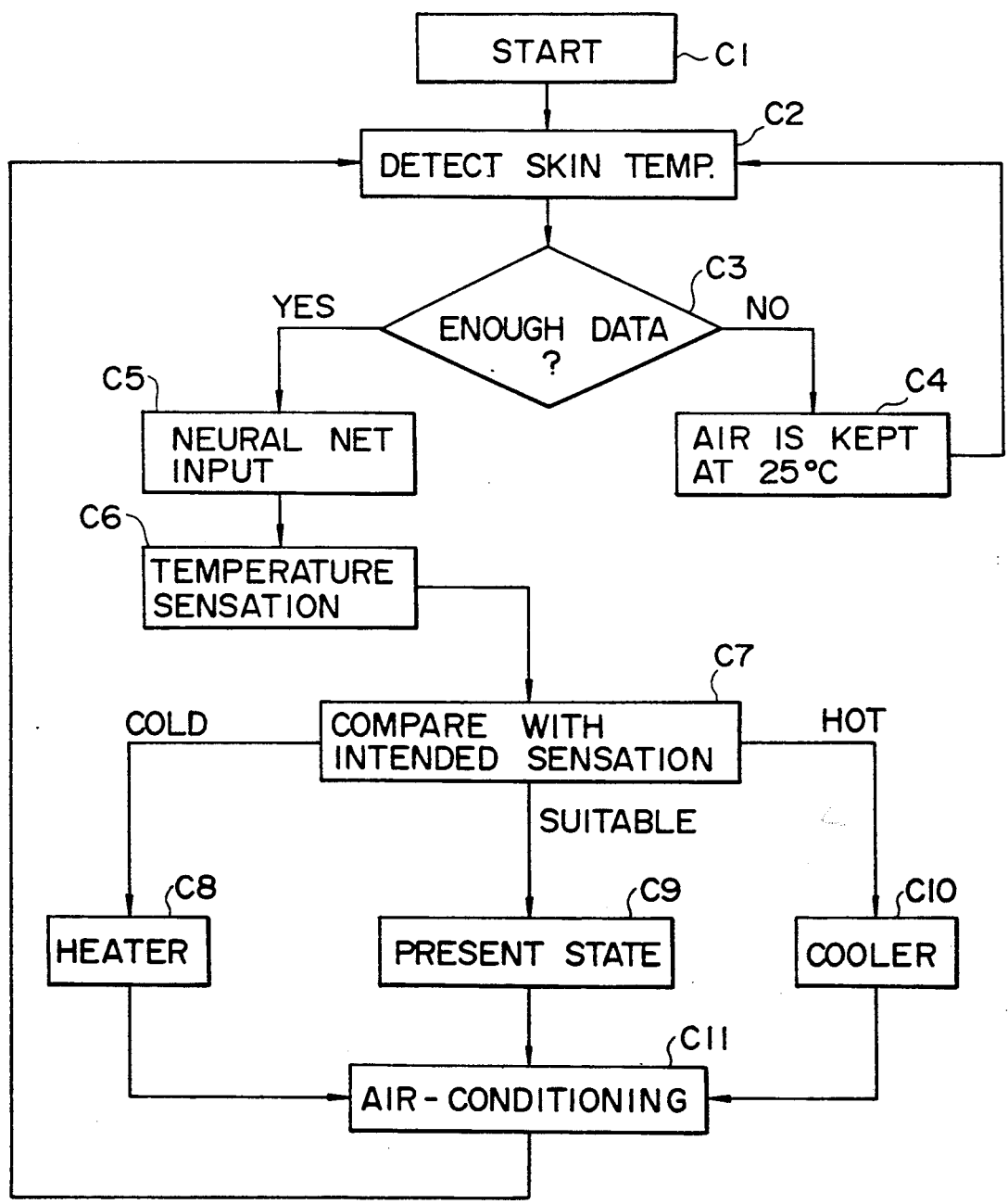
FIG. 20 is a flowchart illustrating a series of operations performed for air conditioning in accordance with the present invention.

The manner in which the temperature is controlled for 1 minute and 30 seconds since the beginning of the air conditioning is described now. FIG. 20 is a flowchart illustrating the method of controlling the temperature. A person gets into the automobile, and the engine is started. Thus, air conditioning is commenced (step C1). The skin temperature is detected by the present air conditioner (step C2). The number of skin temperatures measured up to now is checked (step C3). The present air conditioner needs skin temperatures measured at four discrete instants of time to estimate the passenger's temperature sensation. In this condition, only one temperature has been obtained from the beginning of the air conditioning. The result of decision made in step C3 is that the amount of data is insufficient. Then, control goes to step C4, where the temperature is controlled to maintain the temperature inside the passenger compartment at the target temperature, say 25° C.), in the same manner as in the prior art automatic air conditioner. Control returns to step C2, where the skin temperature is measured. If the result of the decision made in step C3 is that skin temperatures at four or more instants have been measured, then the skin temperatures are applied to the neural net (step C5). The neural net produces an output signal, so that the passenger's temperature sensation is obtained (step C6). The intended temperature sensation is compared with the temperature sensation obtained in step C6 (step C7). If the passenger's temperature sensation is hotter than the moderate temperature sensation, then control proceeds to step C10. Where an amount of correction is delivered to provide cooling. If both sensations agree, then control goes to step C9, where the present condition is maintained. If the passenger's temperature sensation is cooler than the intended temperature sensation, then the control proceeds to step C8, where an amount of correction is delivered to provide warming. In response to this amount of correction, the speed and the temperature of the blown air are controlled in practice (step C11). Then, control goes back to step C2, where the next skin temperature is measured. This process in this control pattern is repeated so that the temperature inside the passenger compartment may be kept in agreement with the passenger's temperature sensation.

Figure 13:
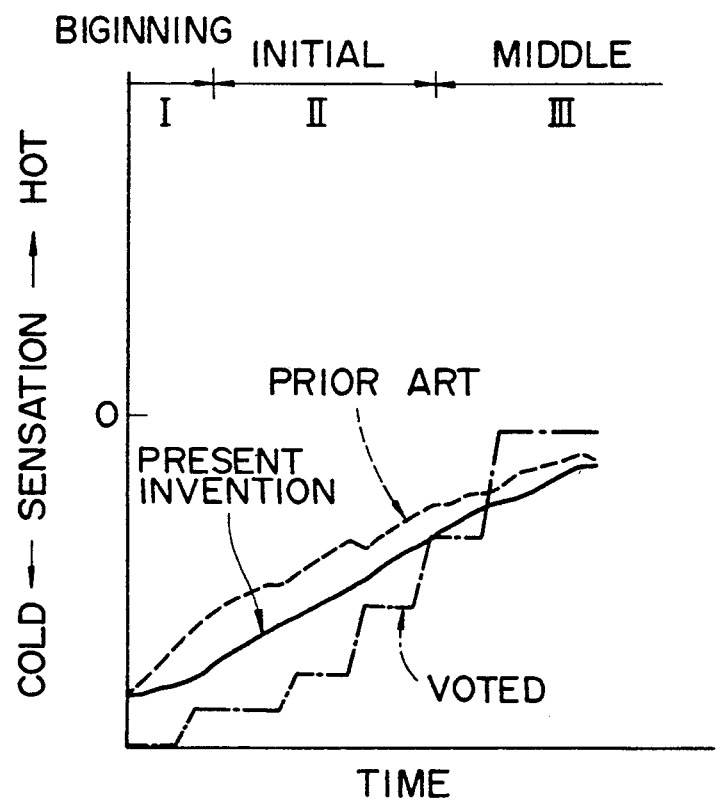
FIG. 13 is a graph showing the results of estimation of temperature sensation made in Example 1 of the invention.

FIG. 13 shows the results of experiments performed inside a laboratory at an outside air temperature of −10° C. without the sun. At the beginning of this series of experiments, the temperature inside the passenger compartment was −10° C. The temperature sensation estimated by the temperature sensation-estimating means of the present Example 1, the temperature sensation estimated using the prior art regression analysis, and the value actually voted by the passenger are compared in this diagram. In the prior art method, the temperature sensation of the examinee is estimated by using the measured skin temperature and the rate of change of this skin temperature as variables and utilizing regression analysis.

In the prior art method, the temperature sensation is estimated, using only the present skin temperature and its rate of change. Therefore, at the beginning I of air conditioning and in the initial phase II, the rate of change of the skin temperature is large, and the estimated temperature sensation does not agree with the voted value. This is because the human sensation is not determined by the skin temperature at each instant of time but the sensation is affected by the past history, or hysteresis, of the skin temperature. In the prior art method which does not take the hysteresis of the skin temperature into account, the accuracy with which the temperature sensation is estimated is low at the beginning of the air conditioning I and in the initial phase II, because the skin temperature changes rapidly and the temperature sensation is affected greatly by the hysteresis of the change of the skin temperature during these initial periods. Also, in the prior art method, the temperature sensation is estimated from the skin temperature measured on estimation of the temperature sensation. Therefore, the estimated sensation is affected materially by the accuracy with which the skin temperature is measured. Variations in the measured value of the skin temperature cause variations in the estimated temperature sensation.

On the other hand, in the present temperature sensation-estimating means, the hysteresis of the skin temperature is employed as input data. When a rapid skin temperature change occurs as encountered in the beginning of the air conditioning I and in the initial phase II as shown in FIG. 13, i.e., when the passenger's temperature sensation is affected greatly by the hysteresis of the change of the skin temperature, the temperature sensation can be estimated accurately. The use of the skin temperature hysteresis permits the air conditioner to know whether the skin temperature is on the upward trend or on the downward trend. Also, the rate of change can be taken into consideration. In consequence, the temperature sensation can be estimated accurately. In this way, the temperature-estimating means of the present example can estimate the temperature sensation with higher accuracy than the prior art temperature-estimating means.

The correction amount-determining means 4 calculates the amount of correction made to the temperature of the blown air and the amount of correction made to the flow rate of the air, according to the results of the estimation made thus far. Then, the air-conditioning control means 5 changes the opening in the air mix damper 105, and the temperature set by the evaporator 103 and the heater core 104 shown in FIG. 12 according to the calculated amounts of corrections. The blower 102 (FIG. 12) blows hot air into the passenger compartment 91 according to the output from the correction amount-determining means 4, the temperature of the hot air being controlled by the air-conditioning means 5.

In the air-conditioner of this Example 1, the inside of the passenger compartment is air-conditioned to obtain adequate wind temperature and adequate wind speed while estimating the temperature sensation, depending on the passenger's skin temperatures which were measured in the past and also on the presently measured skin temperature. Consequently, Example 1 of the invention estimates the temperature sensation with higher accuracy than in the case in which only the present skin temperature is found by regression analysis in the prior art techniques. Hence, the desired temperature sensation can be approached quickly.

EXAMPLE 2

Figure 6:
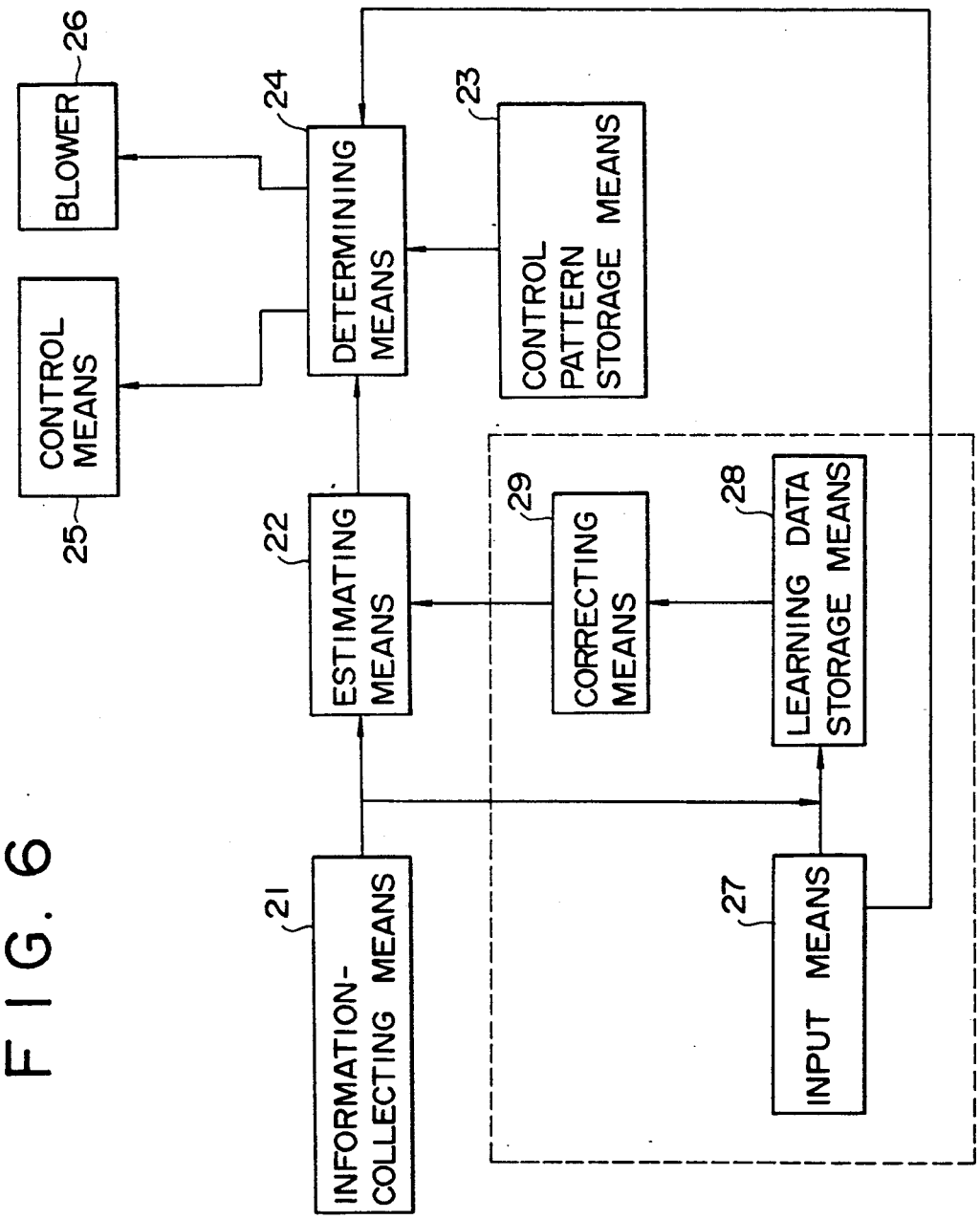
FIG. 6 is a block diagram of an air conditioner of Example 2 of the invention.

Example 2 of the invention includes the components surrounded by the broken line in FIG. 6 in addition to the components of Example 1 described above. The components surrounded by the broken line in FIG. 6 are a desired temperature sensation input means 27, a learning data storage means 28, and an estimated temperature sensation-correcting means 29. The desired temperature sensation input means 27 consists of a temperature sensation operation button 114 (FIG. 12) permitting the passenger to enter desired temperature sensation. The storage means 28 stores the hysteresis of the temperature sensation information produced from a temperature sensation information-collecting means 21 and desired temperature sensation applied by operating the button 114. The estimated temperature sensation-correcting means 29 modifies the weights and the threshold values for the neural net forming a temperature sensation-estimating means 22, according to the learning data stored in the learning data storage means 28. These means are all incorporated in the control unit 111 (FIG. 12) consisting of a microcomputer.

This Example 2 is similar in operation to Example 1 described above except that Example 2 is characterized by the addition of the temperature sensation operation button 114 which forms the desired temperature sensation input means 27 shown in FIG. 6, to permit each individual person to modify the temperature sensation according to his or her own sensation.

Temperature sensation differs slightly from person to person. In this Example 2, the temperature sensation operation button enables any passenger to enter desired temperature sensation. Therefore, the weights and the threshold values for the neural net forming the temperature sensation-estimating means 22 can be altered according to the individual sensation. In this manner, the passenger compartment can be quickly made comfortable for the passenger by the air conditioning.

In this Example 2, the temperature sensation is estimated by the temperature sensation-estimating means 22 according to the hysteresis of the temperature sensation measured every 30 seconds for 1 minute and 30 seconds up to now. If this estimated temperature sensation does not agree with the actual temperature sensation, the passenger operates the temperature sensation operation button 114. Then, an input signal is directly applied to a correction amount-determining means 24 to effect quick air conditioning. The determining means 24 determines appropriate amounts of corrections and sends these amounts to an air-conditioning control means 25. This control means 25 controls the air conditioning according to the determined amounts of corrections, i.e., according to the instructions created by operating the temperature sensation operation button 114.

Meanwhile, data about the skin temperature used for the estimation of the temperature sensation is stored in the learning data storage means 28. Also, the signal entered from the temperature sensation operation button 114 is stored in the storage means 28. When the inside of the passenger compartment is not required to be air-conditioned, an estimated temperature sensation-correcting means 29 calculates the amount of correction made to the estimated temperature sensation, from the data stored in the data storage means 28. This calculation is performed by the same method as used for the determination of the weights and the threshold values in Example 1 above. The weights and the threshold values for the neural net forming the temperature sensation-estimating means 22 are modified according to the results of the calculations performed by the estimated temperature sensation-correcting means 29.

Figure 14:
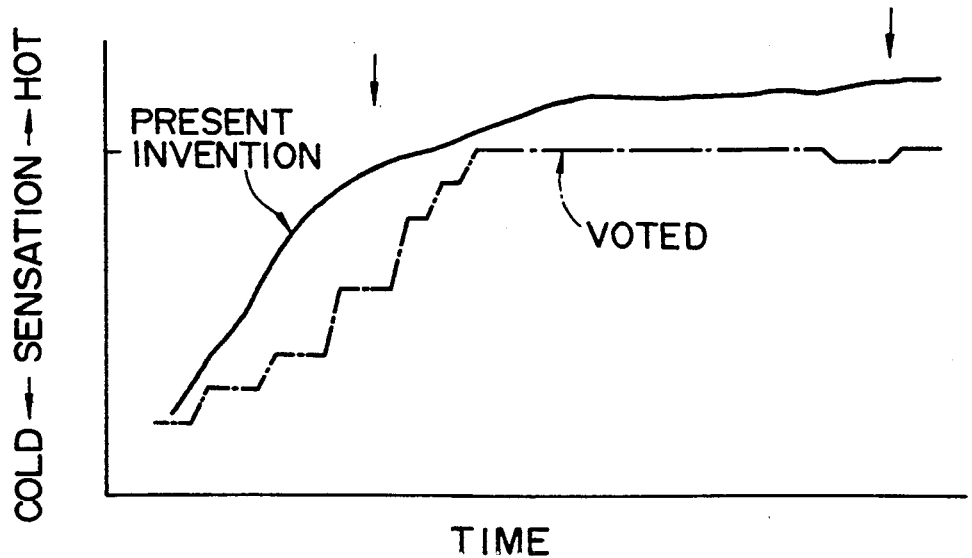
FIG. 14 is a graph showing the results of estimation of temperature estimation, and in which the estimated temperature sensation is not yet corrected.
Figure 15:
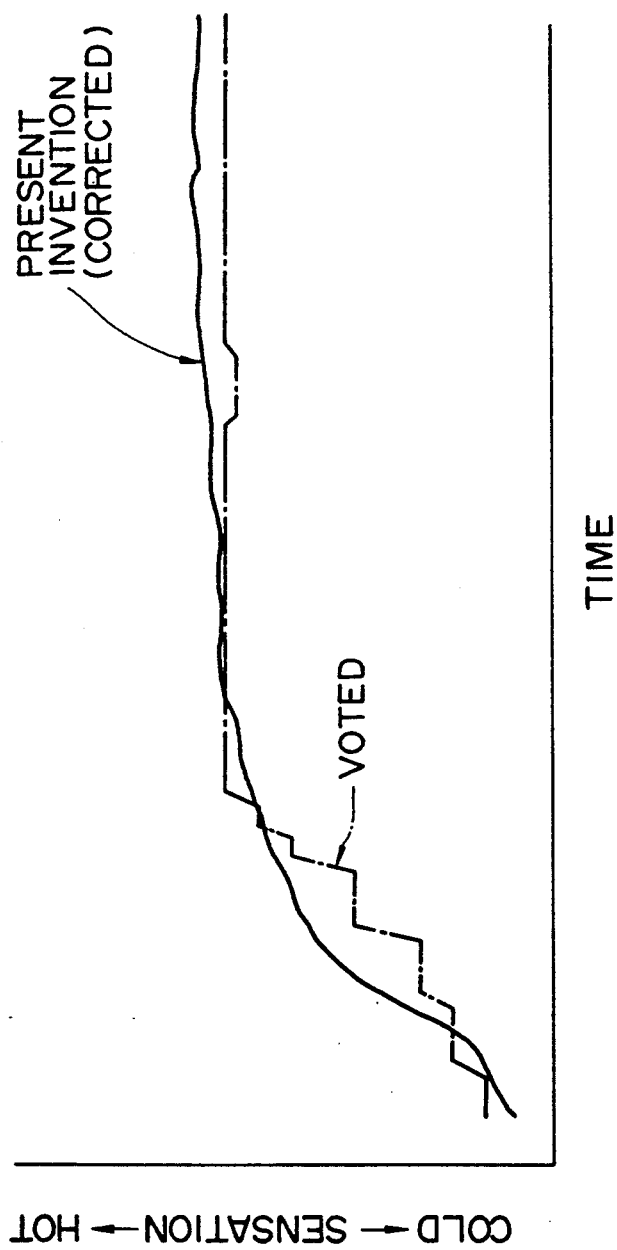
FIG. 15 is a graph similar to FIG. 14, but in which the estimated temperature sensation has been corrected.

FIGS. 14 and 15 show the results of experiments performed to ascertain the effects of the improvement in the accuracy at which the temperature sensation is estimated, the improvement being made by operating the temperature sensation operation button. When this series of experiments was started, the outside temperature was 0° C., the temperature inside the passenger compartment was 0° C., and there was not the sun.

The graph of FIG. 14 shows the condition prior to modification. The estimated temperature sensation deviated from the declared value of the examinee throughout the measurement. The temperature sensation operation button was operated at the instants indicated by the arrows in FIG. 14. After the completion of this experiment, a modification was made to the temperature sensation estimated by the temperature sensation-estimating means 22 according to the input data from the temperature sensation operation button. The effects of the correction are shown in FIG. 15. The deviation of the estimated temperature sensation from the declared value was corrected considerably throughout the measurement. Thus, it can be seen that the accuracy of the estimation of the temperature sensation was improved.

As described thus far, Example 2 of the invention is equipped with the temperature sensation operation button to allow the temperature sensation estimated by the temperature sensation-estimating means to be corrected according to the passenger's temperature sensation. Hence, the estimated temperature sensation can be made to agree well with the passenger's temperature sensation.

Figure 7:
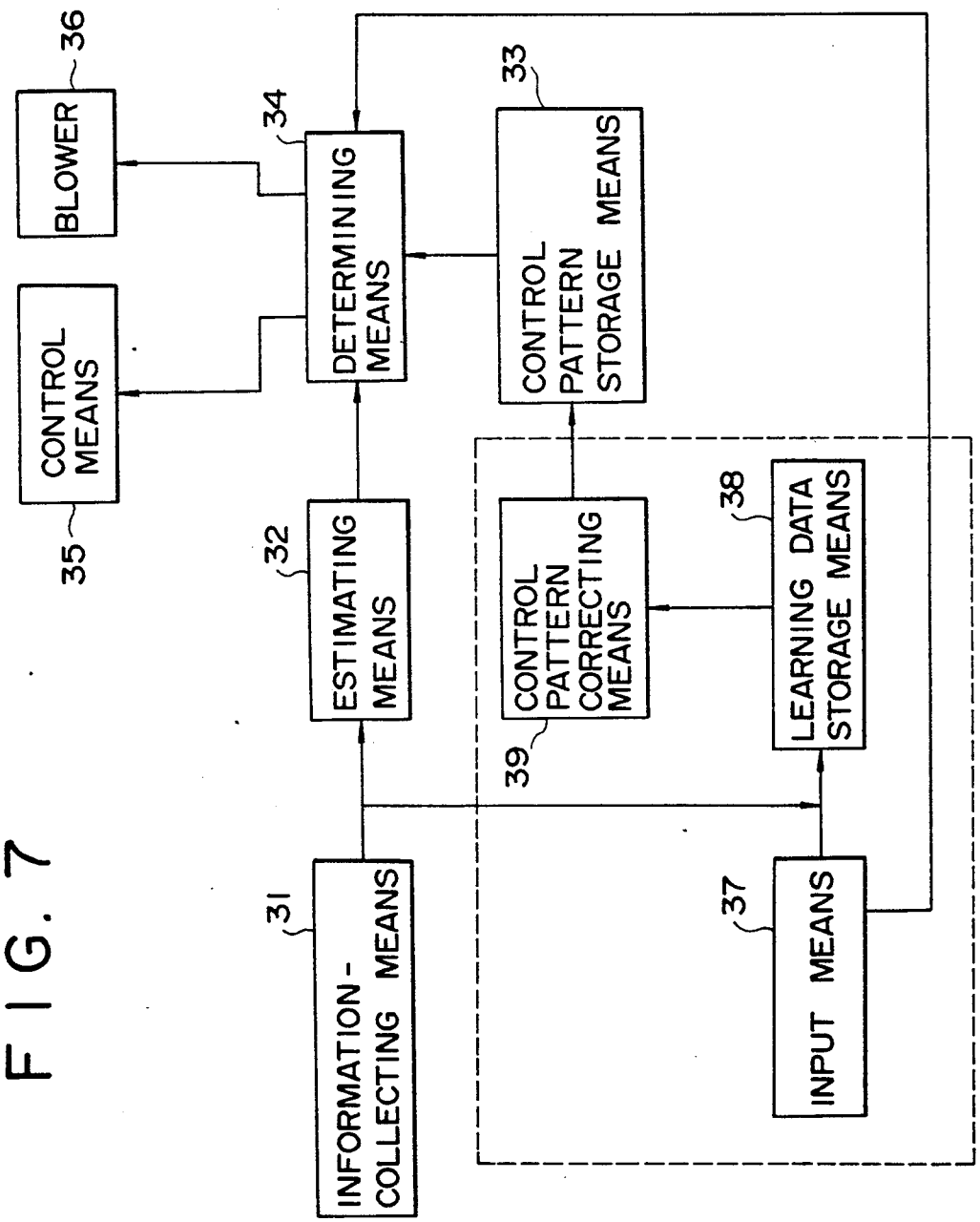
FIG. 7 is a block diagram of Example 2 of the invention.

In this example, the weights and the threshold values for the neural net forming the temperature sensation-estimating means 22 are modified according to learning data. As shown within the frame indicated by the broken line in FIG. 7, the control pattern in a control pattern storage means 33 may be modified according to the learning data. That is, no corrections are made to the weights or the threshold values for the neural net forming the temperature sensation-estimating means 33. Only the pattern of the intended temperature sensation is modified according to the signal produced by operating the temperature sensation operation button 114.

Figure 16:
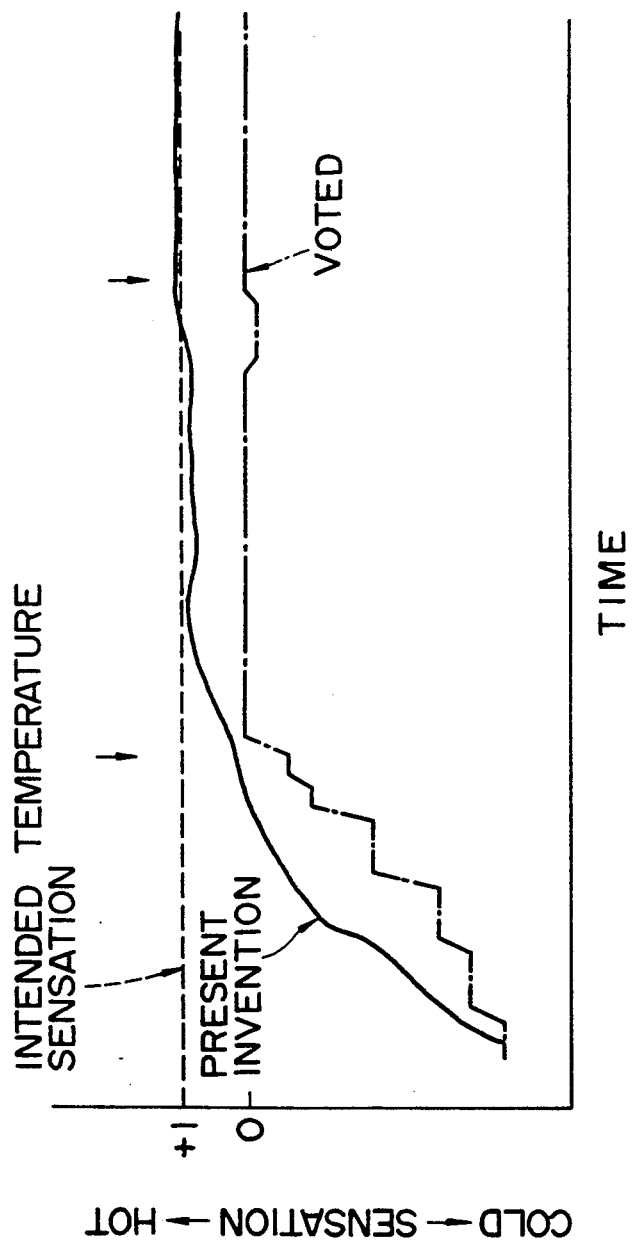
FIG. 16 is a graph showing temperature sensation, and in which the control pattern used in Example 2 is not yet corrected.
Figure 17:
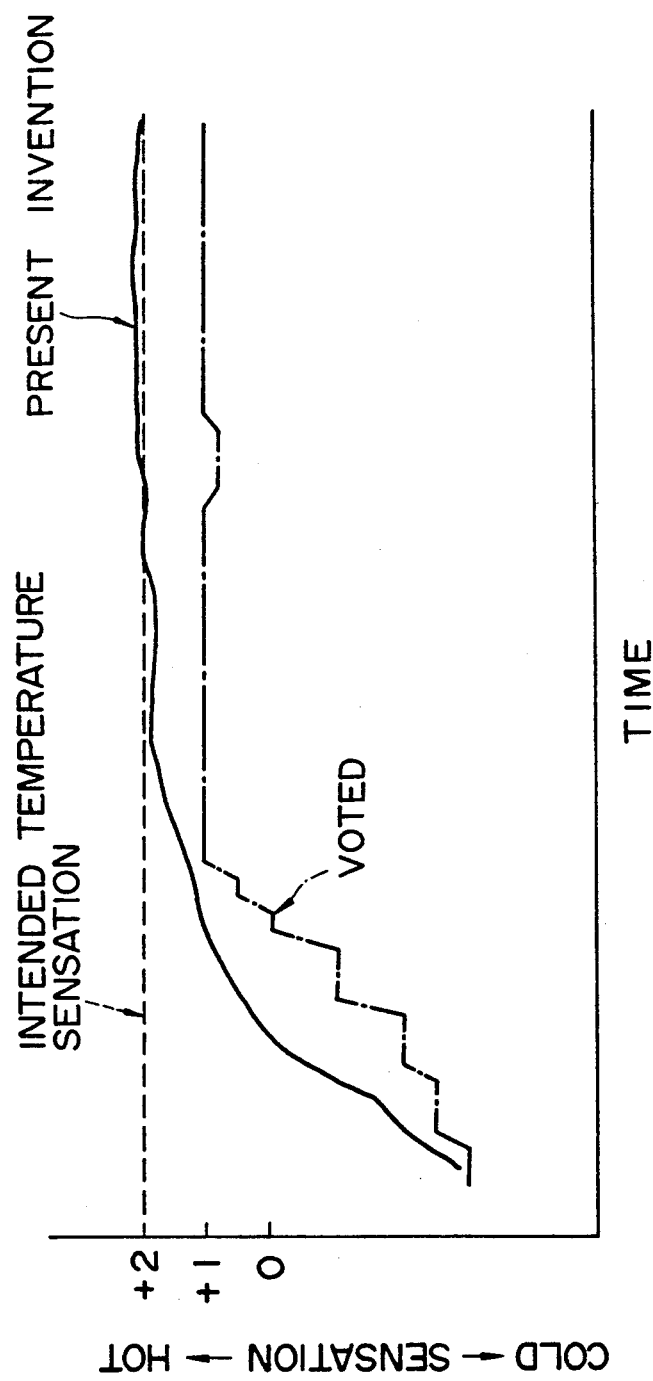
FIG. 17 is a graph similar to FIG. 16, but in which the control pattern used in Example 2 has been corrected.

FIGS. 16 and 17 show the results of experiments performed to ascertain the effects of the improvement in the approximation of the modified temperature sensation to the intended temperature sensation, the improvement being achieved by modifying the control pattern alone as described above. In FIG. 16, the air conditioner works in such a way that the condition of the desired temperature sensation plus 1, i.e., slightly warmer, is maintained. In this series of experiments, the value of the temperature sensation voted by the passenger was 0, i.e., he or she felt moderate. Therefore, the passenger operated the button 114 at the instants indicated by the arrows in FIG. 16 to produce a signal, for modifying the intended temperature sensation in a warmer direction.

This signal was stored in a learning data storage means 38 together with the intended temperature sensation at this instant. A control pattern-modifying means 39 calculates the difference between the temperature sensation indicated by the input signal and the intended temperature sensation according to the data stored in the storage means 38. Then, the control pattern stored in the control pattern storage means 33 is modified to thereby modify the intended temperature sensation. The results of an experiment on this scheme are shown in FIG. 17. The intended temperature sensation was adjusted to a condition of the intended temperature sensation plus 2, i.e., warmer. Therefore, the value voted by the passenger could be maintained in a condition of the original intended temperature sensation plus 1, i.e., slightly warmer. In this way, the temperature sensation required by the passenger is entered through the temperature sensation operation button to modify the intended temperature sensation. This permits the passenger compartment to be air-conditioned appropriately according to the temperature sensation of each individual passenger.

Other methods of correcting the control pattern are also possible. As described already in Example 1 in connection with FIG. 5(a), (b), (c), several control patterns have been previously stored in the control pattern storage means. The best control pattern is selected out of them according to the desire of the passenger. Furthermore, it is possible to shift the stored temperature control pattern in a warmer or colder direction according to the input signal from the temperature sensation control button 114, i.e., according to the desire of the passenger. Then, the modified pattern is used.

This Example 2 yields the same advantages as the above-described Example 1. In addition, Example 2 is capable of modifying the weights and the threshold values for the neural net forming the temperature sensation-estimating means or the control pattern for the intended temperature sensation according to the passenger' desire. In consequence, the passenger compartment can be air-conditioned according to the desire of each individual passenger.

EXAMPLE 3

Figure 8:
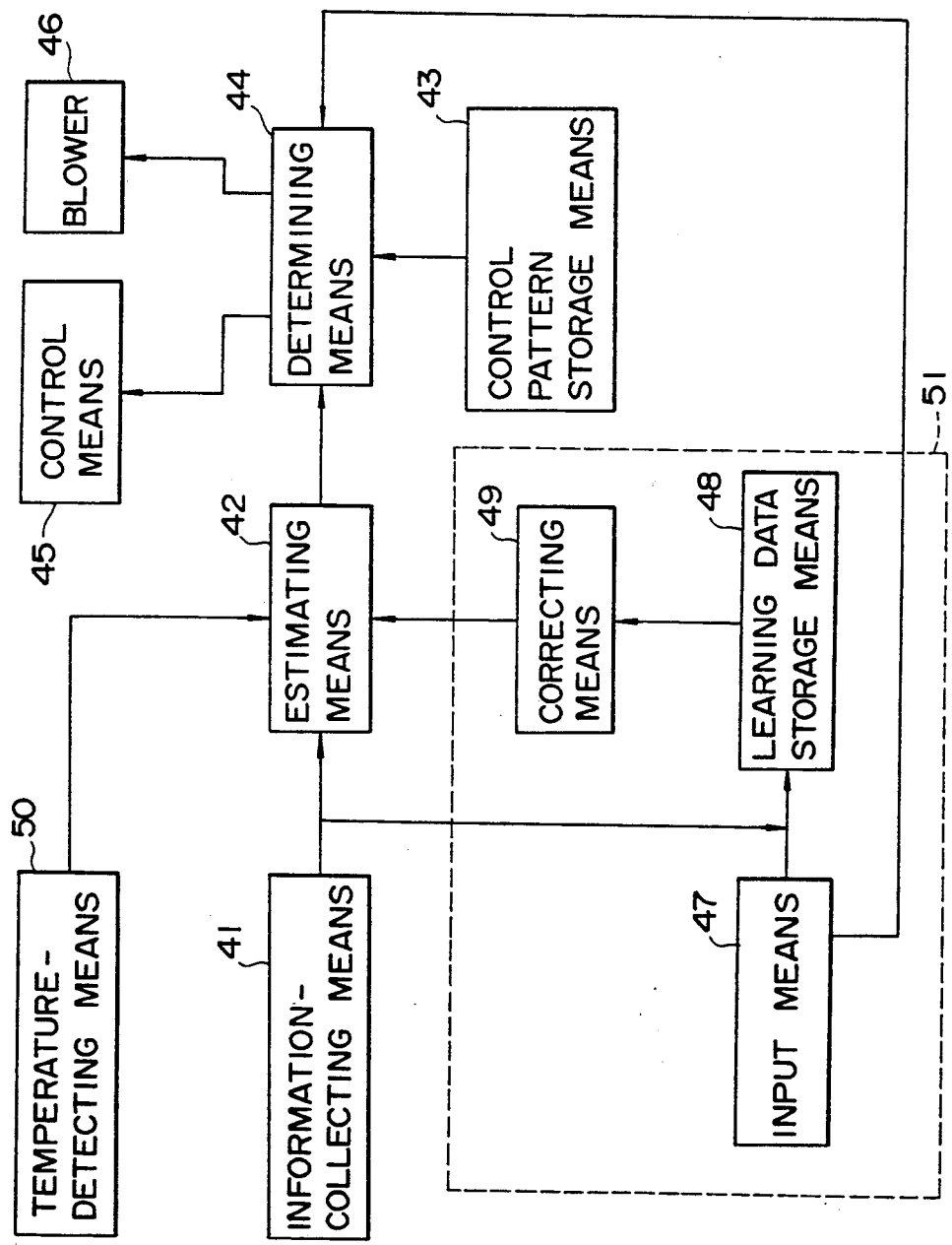
FIG. 8 is a block diagram of an air conditioner of Example 3 of the invention.
Figure 9:
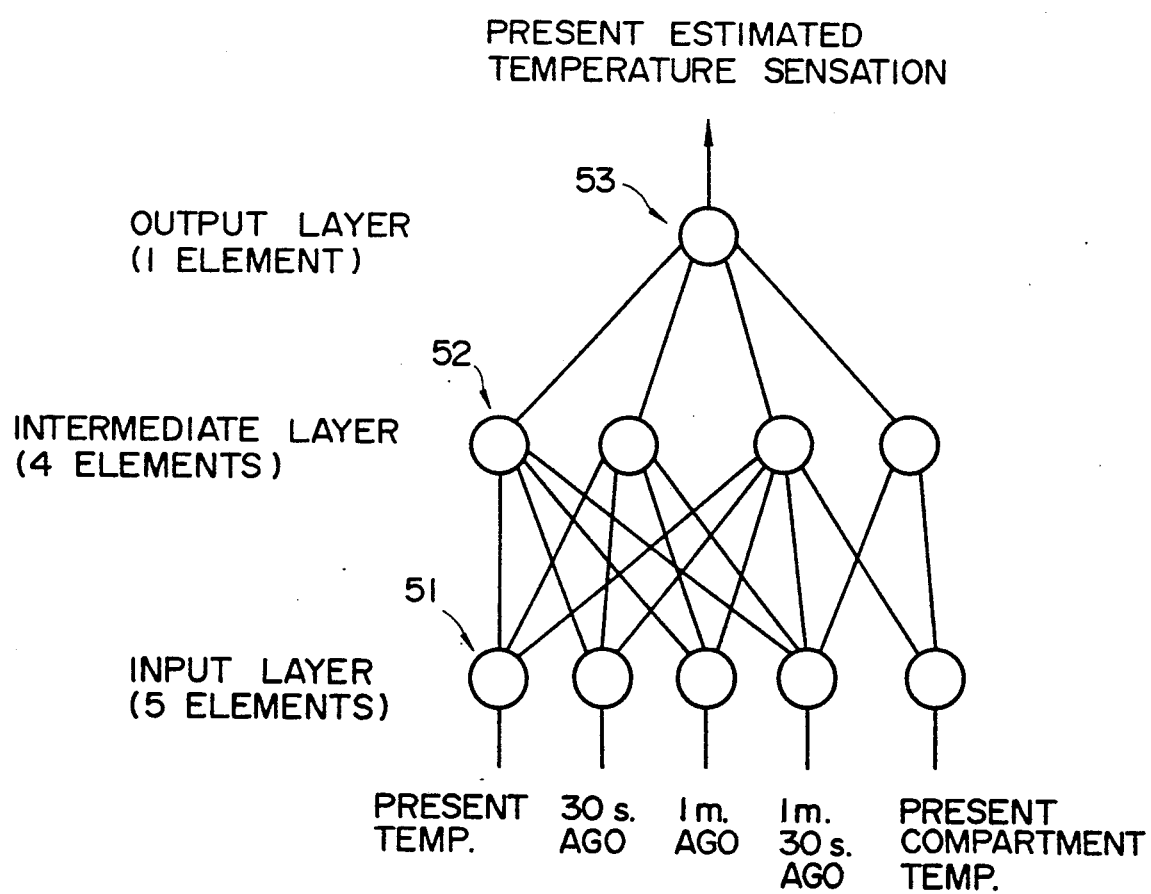
FIG. 9 is a diagram illustrating the structure of the temperature sensation-estimating means of Example 3 of the invention.

This Example 3 is similar to Example 2 except that a passenger compartment temperature-detecting means 50 is added as shown in FIG. 8. This detecting means 50 can be a passenger compartment temperature-detecting sensor 115 (FIG. 12) installed in a center console mounted close to the driver's feet. The sensor 115 consists of, for example, a thermocouple. In this example, a signal indicating the temperature inside the passenger compartment is also applied to a temperature sensation-estimating means 42. Therefore, the number of the elements of the input layer of the neural net forming the temperature sensation-estimating means 42 is increased by 1 as compared in Example 2 as shown in FIG. 9. The threshold values for the elements and the weights of the couplings between the elements of the neural net are determined by previous education by the same method as used in Example 1. This educational data used as input data includes the temperature inside the passenger compartment.

This Example 3 is similar in operation to Example 2 except for the following point. The passenger compartment temperature is added to the information used in estimating the temperature sensation to further improve the accuracy of the estimation of the temperature sensation, it being noted that in Examples 1 and 2, the temperature sensation is estimated only according to the temperature sensation from the temperature sensation information-collecting means. In Examples 1 and 2, if a person who stayed for a long time in a relatively cold space before he or she got into the automobile in summer, and if the person then got into the automobile whose passenger compartment got hot in the sun, then there is a possibility that the estimated temperature sensation is estimated to be lower than the actual temperature sensation, since the passenger's skin temperature was low. In the present Example 3, however, the conditions of the surroundings of the passenger can be known, using the passenger compartment temperature-detecting sensor 115. The temperature inside the passenger compartment accommodating the passenger is used in estimating the temperature sensation, as well as the temperature of the skin of the passenger. In this manner, the temperature sensation can be estimated more accurately.

Figure 18:
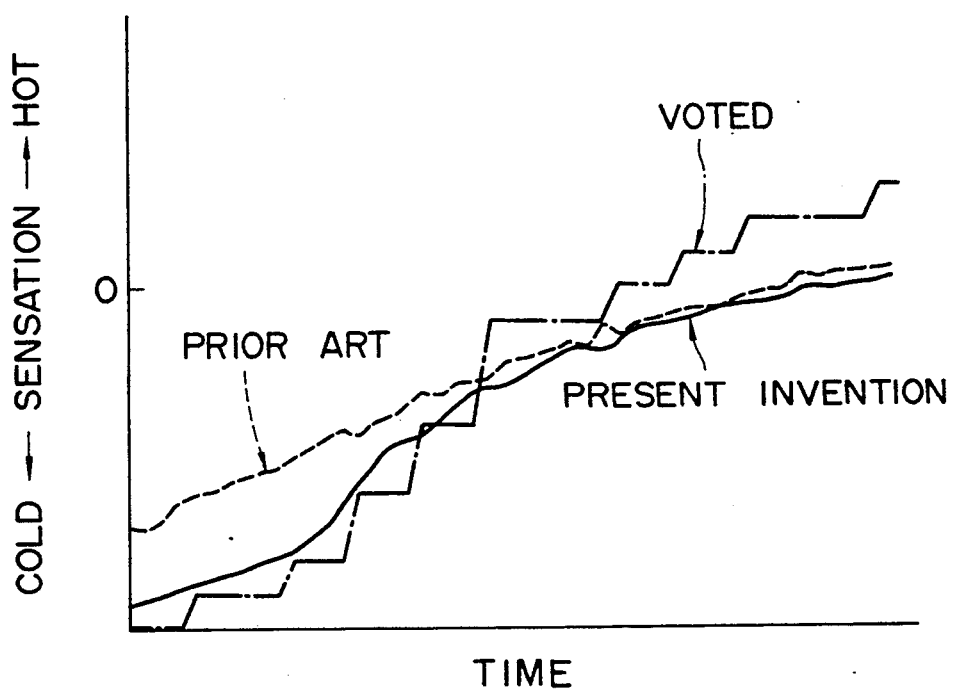
FIG. 18 is a graph showing the results of estimation of temperature sensation made in Example 3 of the invention.

FIG. 18 shows the temperature sensation estimated by the present Example 3 taking also the temperature inside the passenger compartment into account, the temperature sensation estimated by the prior art method, and the value voted by the examinee, for comparing these three kinds of values. When the experiment was started, the outside air temperature was −10° C., the passenger compartment temperature was −10°0 C., and there was not the sun.

Where the temperature inside the passenger compartment is not entered as in Example 1, only the skin temperature is entered in the initial phase II of the air conditioning shown in FIG. 13 and so the exchange of heat with the surrounding air cannot be taken into account. This makes it impossible to estimate the examinee's temperature sensation accurately.

However, where the temperature inside the passenger compartment is also entered as in Example 3, the exchange of heat with the surrounding air can be taken into consideration. Hence, the temperature sensation can be estimated more accurately.

In FIG. 13 where the temperature inside the passenger compartment is not taken into account, the estimated temperature sensation deviates slightly from the actual temperature sensation at the beginning I of the air conditioning and in the initial phase II. In the example of FIG. 18 where the temperature inside the passenger compartment is taken into account, the deviation has been corrected. As a result, the temperature sensation can be estimated accurately.

As described thus far, where the temperature inside the passenger compartment is not taken into account, the accuracy of the estimation of the temperature sensation may deteriorate at the beginning of the air conditioning. On the other hand, where the temperature inside the passenger compartment is taken into account as in the present Example 3, the temperature sensation can be estimated accurately even if the skin temperature no longer changes greatly.

The estimated temperature sensation is compared with the temperature sensation control pattern stored in a control pattern storage means 43 by a correction amount-determining means 44. If the estimated temperature sensation is shifted in a colder direction, and if the weather needs heating, then an amount of correction is transmitted to an air-conditioning control means 45 so as to increase the heater output. If the weather necessitates cooling, then the cooler output is lowered. The control means 45 varies the opening in the air mix damper 105 according to the amount of correction. The blower 102 blows a controlled amount of air into the passenger compartment 91.

This Example 3 has an estimated temperature sensation-correcting means 51 similar to the estimated temperature sensation-correcting means 29 of Example 2 described above. Therefore, the temperature sensation can be controlled according to the desire of the passenger, and more accurate air conditioning is possible.

In this way, this Example 3 of the novel air conditioner has the same advantages as Examples 1 and 2 described above. Additionally, this example can estimate the temperature sensation, taking account of the temperature inside the passenger compartment accommodating the passenger, since the signal indicating the temperature inside the passenger compartment is also applied. This enables accurate estimation of the temperature sensation. Hence, accurate air conditioning is possible.

EXAMPLE 4

Figure 10:
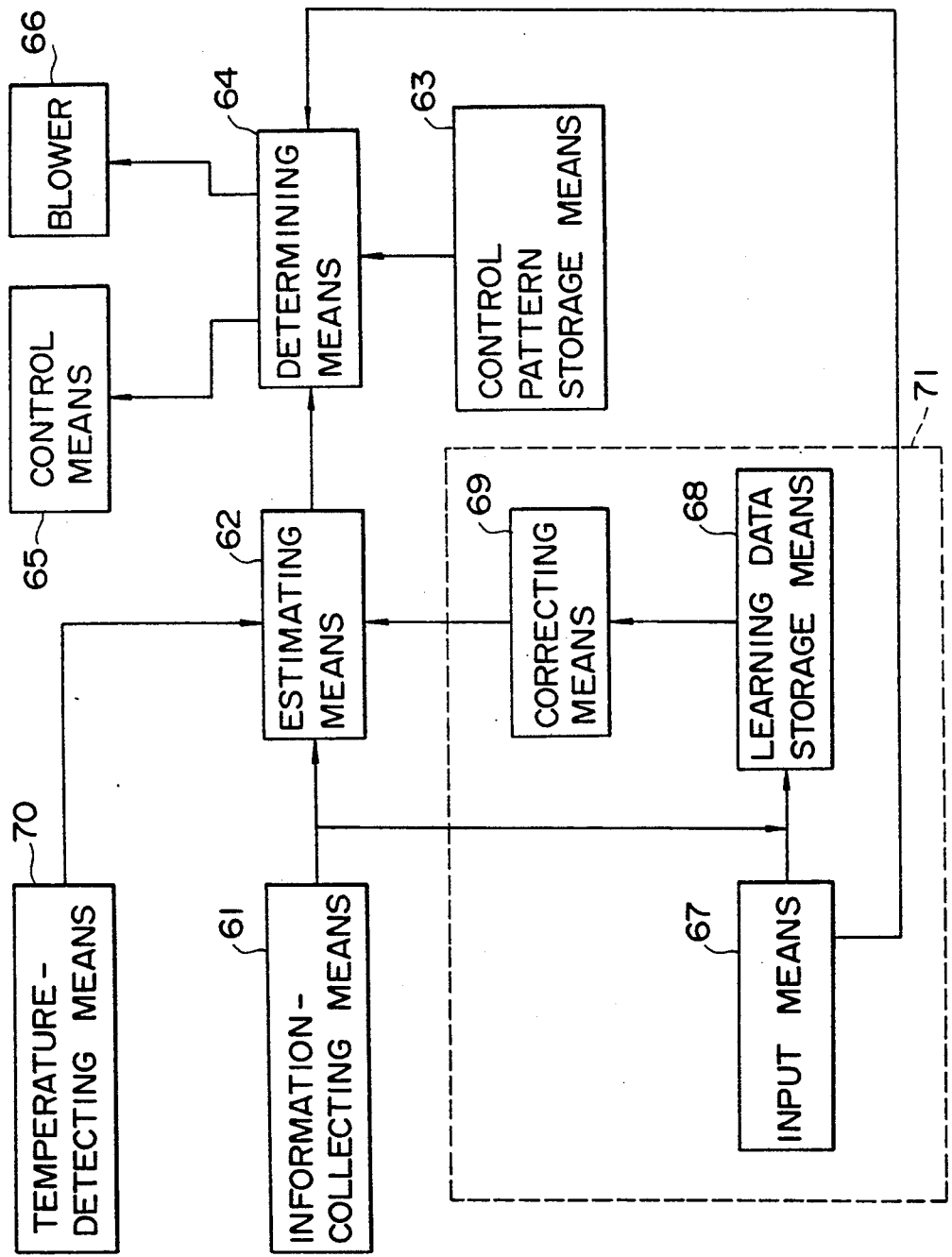
FIG. 10 is a block diagram of an air conditioner of Example 4 of the invention.

Example 4 is similar to the above-described Example 3 except that a temperature sensation-estimating means 62 receives the hysteresis of the passenger compartment temperature within a given period delivered from a passenger compartment temperature-detecting means 70 consisting of the passenger compartment temperature sensor 115 as shown in FIG. 10. The temperature sensation-estimating means 62 which receives the hysteresis of the passenger compartment temperature every 30 seconds for 1 minute and 30 seconds up to now consists of a neural net. This net is shown particularly in FIG. 11. This neural net is similar in structure to the neural net used in Example 3 except that the number of the elements of the input layer 81 for receiving the hysteresis of the passenger compartment temperature is increased by three. The output layer 83 produces an output value corresponding to the temperature sensation which is determined by taking the hysteresis of the passenger compartment temperature into account. The threshold values for the elements of the temperature sensation-estimating means and the weights of the couplings between the elements are determined by previous education by the same method as used in Example 1 described above. The educational data includes the input hysteresis of the passenger compartment temperature.

This Example 4 is similar in operation to Example 3 except that the hysteresis of the passenger compartment is used in estimating the temperature sensation, in addition to the temperature sensation and the temperature inside the passenger compartment, the latter two kinds of information being used in Example 3. The infrared thermometer 116 forming a temperature sensation information-collecting means 61 detects the temperature of the skin of the passenger. The present passenger compartment temperature is detected by the passenger compartment temperature sensor 115 forming the passenger compartment temperature-detecting means 70. The hysteresis of the skin temperature and the hysteresis of the present passenger compartment temperature are applied to the temperature sensation-estimating means 62.

Figure 11:
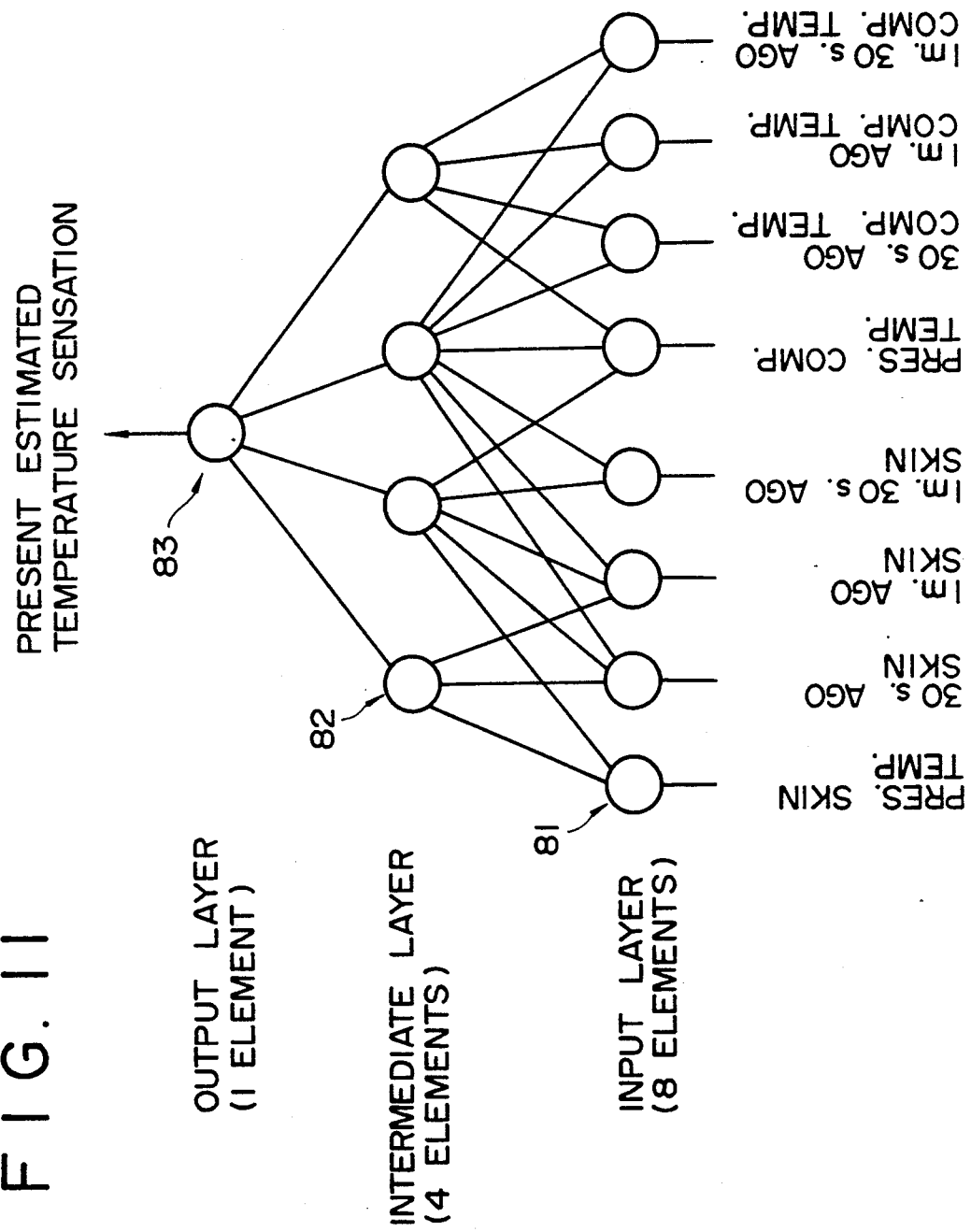
FIG. 11 is a diagram illustrating the structure of the temperature sensation-estimating means of Example 4 of the invention.

In actual air conditioning, the infrared thermometer 116 forming the temperature sensation information-collecting means 61 detects the temperature of the passenger's skin. The passenger compartment temperature sensor 115 forming the passenger compartment temperature-detecting means 70 detects the temperature inside the passenger compartment. As shown in FIG. 11, the present skin temperature, the skin temperatures measured previously, the present temperature inside the passenger compartment, and the temperatures inside the passenger compartment measured previously are applied to the input layer 81. The temperature-estimating means 62 estimates the temperature sensation from these data.

Figure 19:
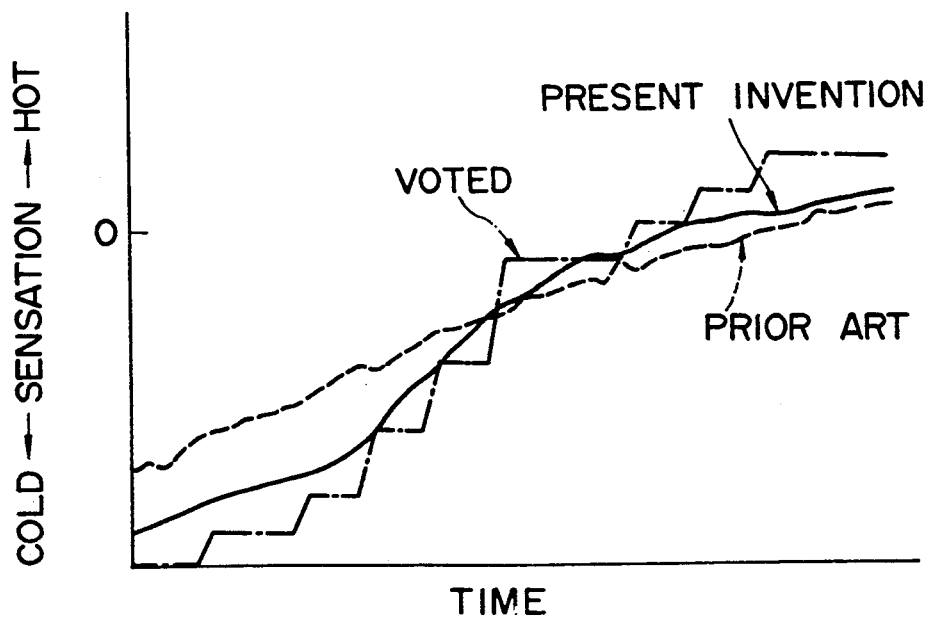
FIG. 19 is a graph showing the results of estimation of temperature sensation made in Example 4 of the invention.

FIG. 19 shows the temperature sensation estimated in the present Example 4, taking the hysteresis of the temperature inside the passenger compartment into account, the temperature sensation estimated by the prior art method, and voted by the examinee, for comparing these three kinds of temperature sensations. When the experiment was started, the outside air temperature was $-10°$ C., the passenger compartment temperature was $-10°$ C., and there was not the sun.

In Example 3 described above, only the present temperature inside the passenger compartment is entered. The hysteresis of this temperature is not taken into consideration and so if the skin temperature and the temperature inside the passenger compartment vary as shown in FIG. 18, it is impossible to know whether the temperature inside the passenger compartment is on the upward trend or on the downward trend. Hence, the temperature sensation cannot be estimated sufficiently accurately.

In the present Example 4, the hysteresis of the temperature inside the passenger compartment is also used as input data. Therefore, the temperature sensation can be estimated accurately, taking the changes in the temperature inside the passenger compartment into account. Furthermore, in the initial phase of the air conditioning in which the skin temperature and the temperature inside the passenger compartment change violently, the temperature sensation can be estimated accurately as shown in FIG. 19.

As described thus far, in the present Example 4, the hysteresis of the temperature inside the passenger compartment is taken into account and, therefore, if the skin temperature and the temperature inside the passenger compartment change violently, the accuracy of the estimation of the temperature sensation can be enhanced.

A correction amount-determining means 64 compares the estimated temperature sensation with the temperature sensation control pattern stored in a control pattern storage means 63. If the estimated temperature sensation is shifted in a colder direction, and if the weather needs heating, then an amount of correction is transmitted to an air-conditioning control means 65 to increase the heater output. If the weather needs cooling, the cooler output is lowered. The air-conditioning control means 65 varies the opening in the air mix damper 105 and the temperature set by the evaporator 103 and the heater core 104 and adjusts the temperature of the wind according to this amount of correction. The blower 102 adjusts the wind speed also according to the amount of correction. In this way, the passenger compartment 91 is air-conditioned.

Therefore, in the present Example 4, the temperature sensation can be estimated from the difference between the present passenger compartment temperature and the past passenger compartment temperature, taking the present trend of the passenger compartment temperature into account, i.e., depending on whether the temperature is on the upward trend or on the downward trend. Also in the present Example 4, the passenger compartment temperature estimated from the hysteresis of the temperature inside the passenger compartment can be used. This permits more accurate estimation of the temperature estimation. As a result, the compartment can be air-conditioned more precisely.

Example 4 yields the same advantages as Examples 1–3 described above. In addition, it is possible to know whether the present temperature inside the passenger compartment is on the upward trend or on the downward trend by utilizing the hysteresis of the temperature inside the passenger compartment. Therefore, the temperature sensation can be estimated with higher accuracy than in Example 3 where the temperature sensation is estimated only from the present temperature inside the passenger compartment and the hysteresis of temperature of the skin. Thus, quick and precise air conditioning can be realized.

In the above examples, the temperature inside the passenger compartment is detected by the passenger compartment temperature-detecting means. In order to effect estimation of the temperature sensation more accurately, a humidity sensor (not shown) may be installed close to the passenger compartment temperature sensor 115 shown in FIG. 12 if necessary. A signal indicating the humidity inside the passenger compartment is applied from the humidity sensor. A solar radiation quantity sensor 113 mounted on the dashboard produces a signal indicating the quantity of solar radiation, and this signal is also applied. A temperature sensor (not shown) installed on the ceiling or at other location produces a signal indicating the environment such as the temperature inside the passenger compartment, the signal being also applied to the air conditioner. A sensor 112 acting as an outside air temperature sensor and also as an outside air humidity sensor is mounted in a duct located at the front end of the vehicle. This sensor produces a signal indicating the temperature of the outside air and a signal indicating the humidity of the outside air. These signals are also supplied to the air conditioner.

In Examples 1–4 described above, the information about the temperature sensation is collected only from one point. Also, the temperature inside the passenger compartment is measured only at one point. Alternatively, the temperature sensation can be estimated from the information collected from a plurality of points.

Obviously, in this case, the number of the input elements and the number of the intermediate elements of the temperature sensation-estimating means are varied, depending on the number of the input signals.

EXAMPLE 5

Figure 21:
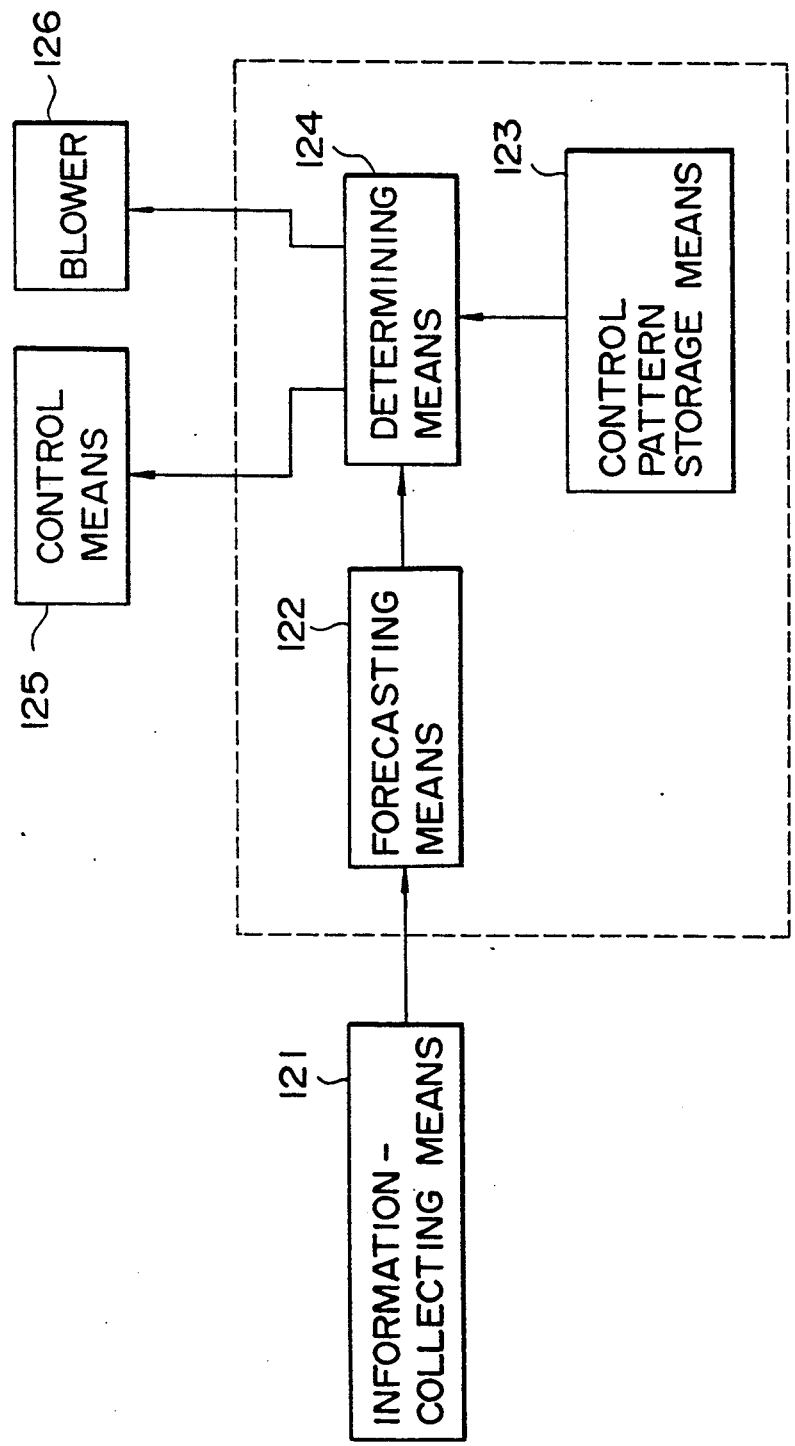
FIG. 21 is a block diagram of Example 5 of the invention.

Example 5 of the present invention is described next by referring to FIG. 12. The infrared thermometer 116 which acts as the temperature sensation information-collecting means 1 detects the temperature of the skin of the face. This thermometer is an infrared sensor which detects the temperature of the skin without contacting it. The control unit 111 forming the air-conditioning unit 92 consists of components surrounded by the broken line in FIG. 21. These components include a control pattern storage means 123, a correction amount-determining means 124, and a temperature sensation-forecasting means 122 all of which are composed of a microcomputer. The temperature sensation-forecasting means 122 consists of a neural net.

Figure 22:
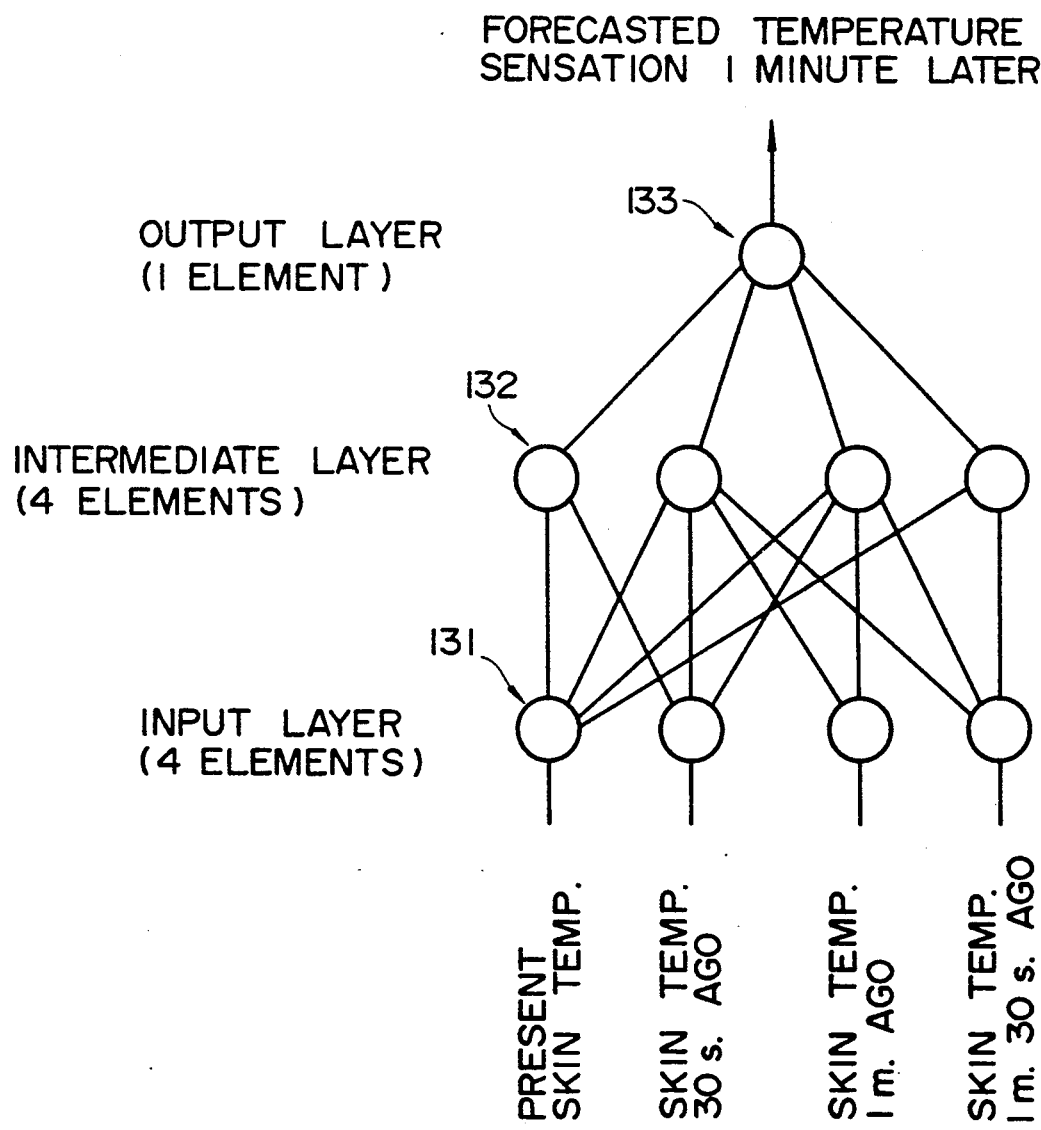
FIG. 22 is a diagram illustrating the structure of the temperature sensation-forecasting means of Example 5 of the invention.

The neural net forming the temperature sensation-forecasting means 122 is shown in FIG. 22. The skin temperatures measured every 30 seconds for several minutes, in this example 1 minute and 30 seconds, are applied to the input layer, together with the present skin temperature. In this example, the neural net constituting the temperature sensation-forecasting means is composed of three layers, i.e., the input layer 131, an intermediate layer 132, and an output layer 133. The input layer 131 consists of four elements. The intermediate layer 132 is made up of four elements. The output layer 133 consists of one element. The output of each element has a nonlinear relationship to the inputs as shown in FIG. 3. The output layer 133 shown in FIG. 22 produces a value corresponding to the future temperature sensation.

The threshold values for the elements of the neural net and the weights of the couplings between the elements are determined by previous education. Specifically, examinations are made on several examinees including men and women in variously air-conditioned states. The skin temperatures and the temperature sensations are collected as educational data. The threshold values and the weights are calculated, based on the educational data, in the manner as illustrated in the flowchart of FIG. 4.

This Example 5 is similar to Example 1 except that the temperature sensation Y used in step 2 is replaced by future temperature sensation to forecast the future temperature sensation. Steps 1-6 are repeated in the same way as in Example 1. The weights and the threshold values which provide a sufficiently small error are set into the neural net which is used to forecast the temperature sensation.

The control pattern storage means 123 serves to previously determine the pattern in which the intended temperature sensation varies with time. For example, as shown in FIG. 5(a), a slightly cold condition is first established. Then, temperature is so controlled that the person feels neither hot nor cold. Another pattern is shown in FIG. 5(b), where a moderate condition is gradually approached. In the pattern shown in FIG. 5(c), a moderate condition is maintained from the first. Similarly, when heating is needed, several patterns are possible.

In this Example 5, the pattern shown in FIG. 5(c) is utilized, i.e., a moderate condition is maintained from the first. Other temperature control patterns including the above-described patterns may also be used. Also, it is possible to store several kinds of control pattern in the control pattern storage means and to select the optimum one out of the stored patterns according to the passenger's desire.

The correction amount-determining means 124 calculates the difference between the 1-minute later temperature sensation forecasted by the temperature sensation-forecasting means and the same instant temperature sensation found from the temperature control pattern previously stored in the control pattern storage means 123. Then, the amount of correction made to the temperature of blown air and the amount of correction made to the speed of the air are calculated from the difference. As shown in FIG. 12, the air-conditioning unit 92 has the conventional structure, and comprises an interior air/outside air switching device 101, a blower 102, an evaporator 103, a heater core 104, an air mix damper 105, and a vent hole 106.

An air-conditioning control means 125 responds to the amounts of correction supplied from the correction amount-determining means 124 and controls the temperature of the conditioning air blown into the passenger compartment 91, through the evaporator 103, the heater core 104, and the air mix damper 105. The blower 102 is a winged air blower having numerous wings on its outer periphery. This blower 102 is mounted near the air intake port in the air-conditioning unit 92. The blower 102 acts to blow air into the passenger compartment 91 at a flow rate determined by the correction amount-determining means 124, the temperature of the air being adjusted by the air-conditioning control means 125.

The operation of this Example 5 is described next. The temperature sensation information-collecting means 121 consisting of the infrared thermometer collects information about the temperature sensation of the passenger. For example, the thermometer measures the temperature of the skin of the driver's face. The temperature sensation-forecasting means 122 is applied with the measured temperature of the passenger's skin. The present skin temperature and skin temperatures measured every 30 seconds for 1 minute and 30 seconds are applied to the temperature sensation-forecasting means 122 consisting of the neural net, which then forecasts the temperature sensation that would be obtained one minute later. The correction amount-determining means 124 compares the forecasted temperature sensation with the temperature sensation which has been previously stored in the control pattern storage means 123 and correspond to the former temperature sensation in time. The difference is calculated. If the forecasted temperature sensation is colder than moderate temperature sensation, and if the weather needs heating, then the heater output is increased. If the weather needs cooling, then the cooler output is lowered. In this way, the amount of correction is transmitted to the air-conditioning control means 125. It is to be noted that only a small amount of data about the skin temperature is available at the beginning of the air conditioning and so the accuracy at which the temperature sensation is estimated is low. Therefore, the temperature of the passenger compartment is retained at 25° C. for 30 seconds since the beginning of the air conditioning, i.e., until a sufficient amount of data is obtained for the temperature sensation-estimating means. Thereafter, the temperature is controlled by the temperature sensation-forecasting means.

Figure 31:
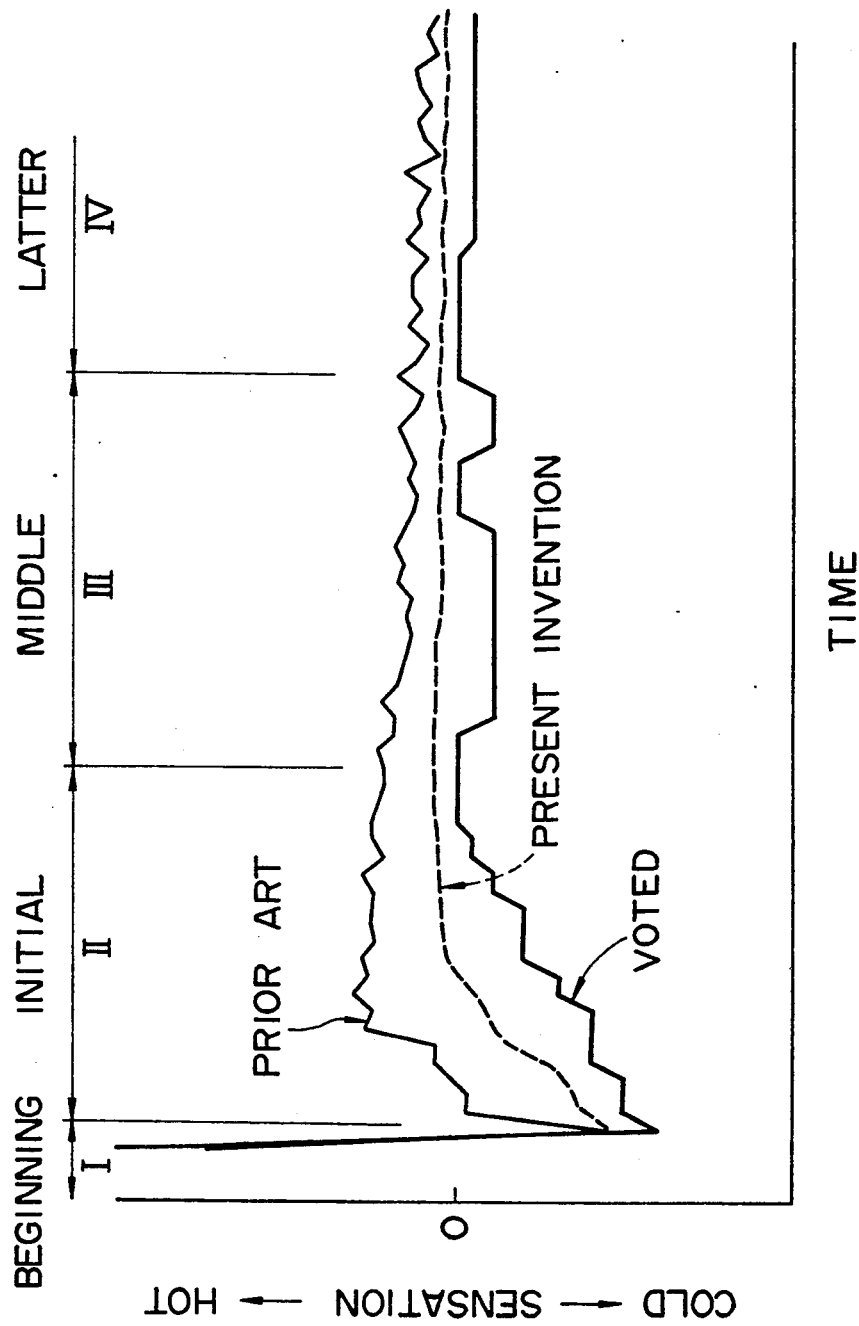
FIG. 31 is a graph showing the results of forecast of temperature sensation made in Example 5 of the invention.

FIG. 31 shows the results of experiments performed inside a laboratory. When this series of experiments is started, the outside air temperature was 35° C., the temperature inside the passenger compartment was 60° C., and the quantity of solar radiation was 900 W/h·m$^2$. The temperature sensation forecasted by the temperature sensation-forecasting means of the present Example 5, the temperature sensation estimated by the prior art regression analysis, and the value actually voted by the passenger are compared in this diagram. In the prior art method, the temperature sensation of the passenger is estimated by using the measured skin temperature and from the rate of change of this skin temperature as variables.

In the prior art method, the temperature sensation is estimated, using only the present skin temperature and its rate of change. Therefore, at the beginning I of air conditioning, the rate of change of the skin temperature is large, and the estimated temperature sensation agrees well with the voted value. However, the estimated sensation soon deviates from the declared value. In the latter phase IV of the air conditioning, the estimated value again approaches the voted value. This is because the human sensation is not determined by the skin temperature at each instant of time but the sensation is affected by the past history, or hysteresis, of the skin temperature. In the prior art method which does not take the hysteresis of the skin temperature into account, the accuracy with which the temperature sensation is estimated is low in the initial phase II, because the skin temperature changes suddenly and the temperature sensation is affected greatly by the hysteresis of the change of the skin temperature. Also, in the prior art method, the temperature sensation is estimated from the skin temperature measured immediately prior to the estimation of the temperature sensation. Therefore, the estimated sensation is affected materially by the accuracy with which the skin temperature is measured. Variations in the measured value of the skin temperature cause variations in the estimated temperature sensation.

On the other hand, in the present temperature sensation-forecasting means, the hysteresis of the skin temperature is employed as input data. When the skin temperature changes rapidly as encountered at the beginning of the air conditioning and in the initial phase II as shown in FIG. 31, i.e., when the passenger's temperature sensation is affected greatly by the hysteresis of the change of the skin temperature, the temperature sensation can be forecasted accurately. The use of the hysteresis of the skin temperature permits the air conditioner to know whether the skin temperature is on the upward trend or on the downward trend. Also, the rate of change can be taken into consideration. In consequence, the temperature sensation can be forecasted accurately.

The correction amount-determining means 124 calculates the amount of correction made to the temperature of the blown air and the amount of correction made to the flow rate of the air, according to the results of the forecast made thus far. Then, the air-conditioning control means 125 changes the opening of the air mix damper 105, and the temperature set by the evaporator 103 and the heater core 104 shown in FIG. 12 according to the calculated amounts of corrections. The blower 102 (FIG. 12) blows hot air into the passenger compartment 91 according to the output from the correction amount-determining means 124, the hot air being controlled by the air-conditioning means 125.

In the air conditioner of this Example 5, the inside of the passenger compartment is air-conditioned to obtain adequate wind temperature and adequate wind speed while forecasting the temperature sensation, depending on the passenger's skin temperatures which were measured in the past and also on the presently measured skin temperature. Consequently, in Example 5 of the invention, the desired temperature sensation can be approached more quickly than in the case in which the present skin temperature is estimated and the control is provided only according to the estimated present temperature sensation as in the prior art techniques.

EXAMPLE 6

Figure 23:
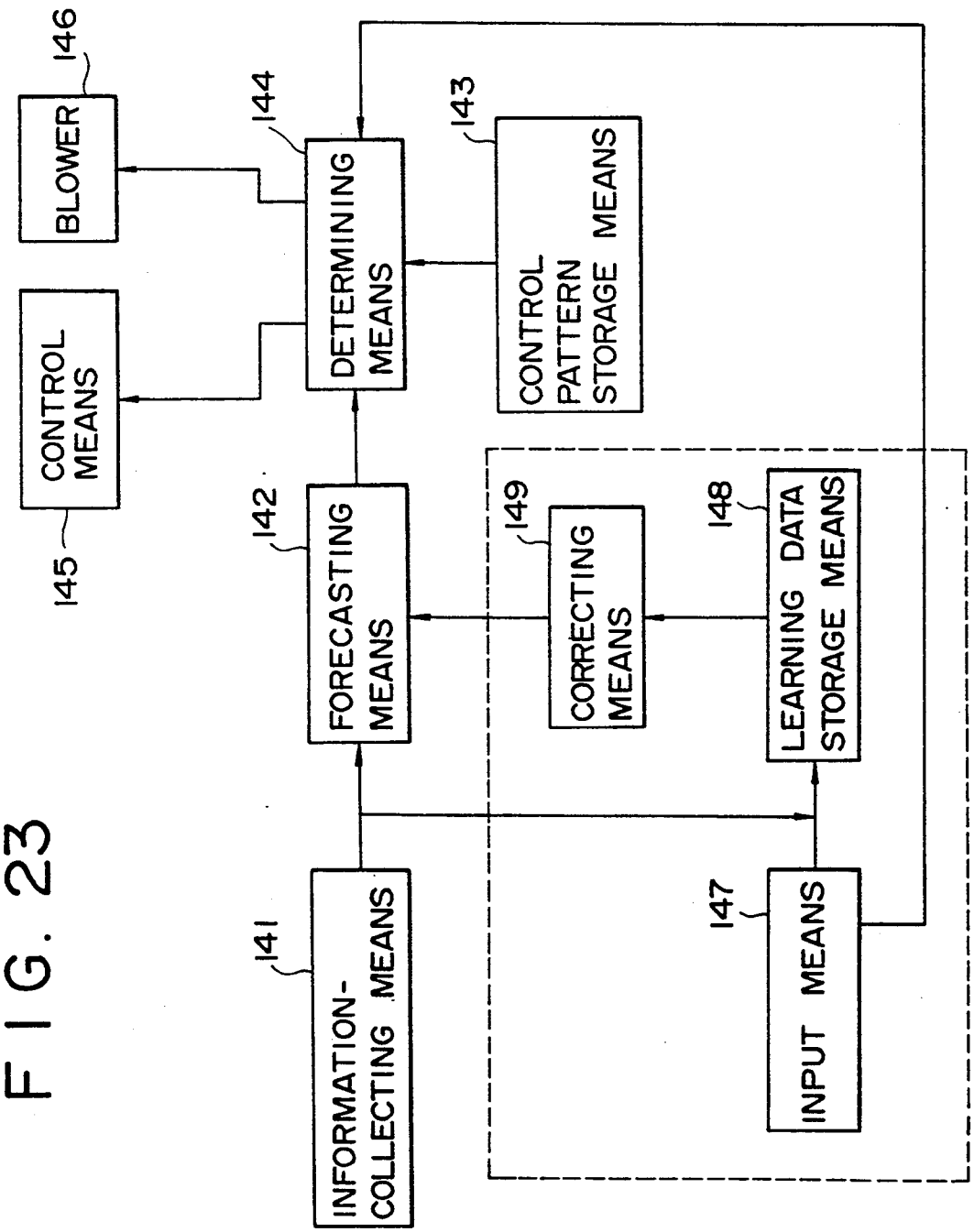
FIG. 23 is a block diagram of an air conditioner of Example 6 of the invention.

Example 6 of the invention includes the components surrounded by the broken line in FIG. 23 in addition to the components of Example 5 described above. The components surrounded by the broken line in FIG. 6 are a desired temperature sensation input means 147, a learning data storage means 148, and an estimated temperature sensation-correcting means 149. The desired temperature sensation input means 147 consists of a temperature sensation operation button 114 (FIG. 12) permitting the passenger to enter his or her desired temperature sensation. The storage means 148 stores the hysteresis of the temperature sensation information produced from a temperature sensation information-collecting means 141 and desired temperature sensation applied by operating the button 114. The forecasted temperature sensation-correcting means 149 modifies the weights and the threshold values for the neural net forming a temperature sensation-forecasting means 142, according to the learning data stored in the learning data storage means 148. These means are all incorporated in the control unit 111 (FIG. 12) consisting of a microcomputer.

This Example 6 is similar in operation to the above-described Example 5 except for the following point. Example 6 is characterized by the addition of the temperature sensation operation button 114 which forms the desired temperature sensation input means 147 as shown in FIG. 23, to permit each individual person to modify the temperature sensation according to his or her own sensation.

Temperature sensation differs slightly from person to person. In this Example 6, the temperature sensation operation button enables any passenger to enter desired temperature sensation. Therefore, the weights and the threshold values for the neural net forming the temperature sensation-forecasting means 142 can be altered according to the individual sensations. In this manner, the passenger compartment can be quickly made comfortable for the passenger by the air conditioning.

In this Example 6, the temperature sensation is forecasted by the temperature sensation-forecasting means 142 according to the hysteresis of the temperature sensation measured every 30 seconds for 1 minute and 30 seconds up to now. If this estimated temperature sensation does not agree with the actual temperature sensation of the passenger, he or she operates the temperature sensation operation button 114 that is the desired temperature sensation input means 147. Then, an input signal is directly applied to a correction amount-determining means 144 to effect quick air conditioning. The determining means 144 determines appropriate amounts of corrections and sends these amounts to an air-conditioning control means 145. This control means 145 controls the air conditioning according to the determined amounts of corrections, i.e., according to the instructions created by operating the temperature sensation operation button 114.

Meanwhile, data about the skin temperature used for the forecast of the temperature sensation is stored in the learning data storage means 148. Also, the signal entered from the temperature sensation operation button 114 forming the desired temperature sensation input means 147 is stored in the storage means 148. When the inside of the passenger compartment is not required to be air-conditioned, a forecasted temperature sensation-correcting means 149 calculates the amount of correction made to the estimated temperature sensation, from the data stored in the data storage means 148. This calculation is performed by the same method as used for the determination of the weights and the threshold values in Example 5 above. The weights and the threshold values for the neural net forming the temperature sensation-estimating means 142 are modified according to the results of the calculations performed by the forecasted temperature sensation-correcting means 149.

Figure 32:
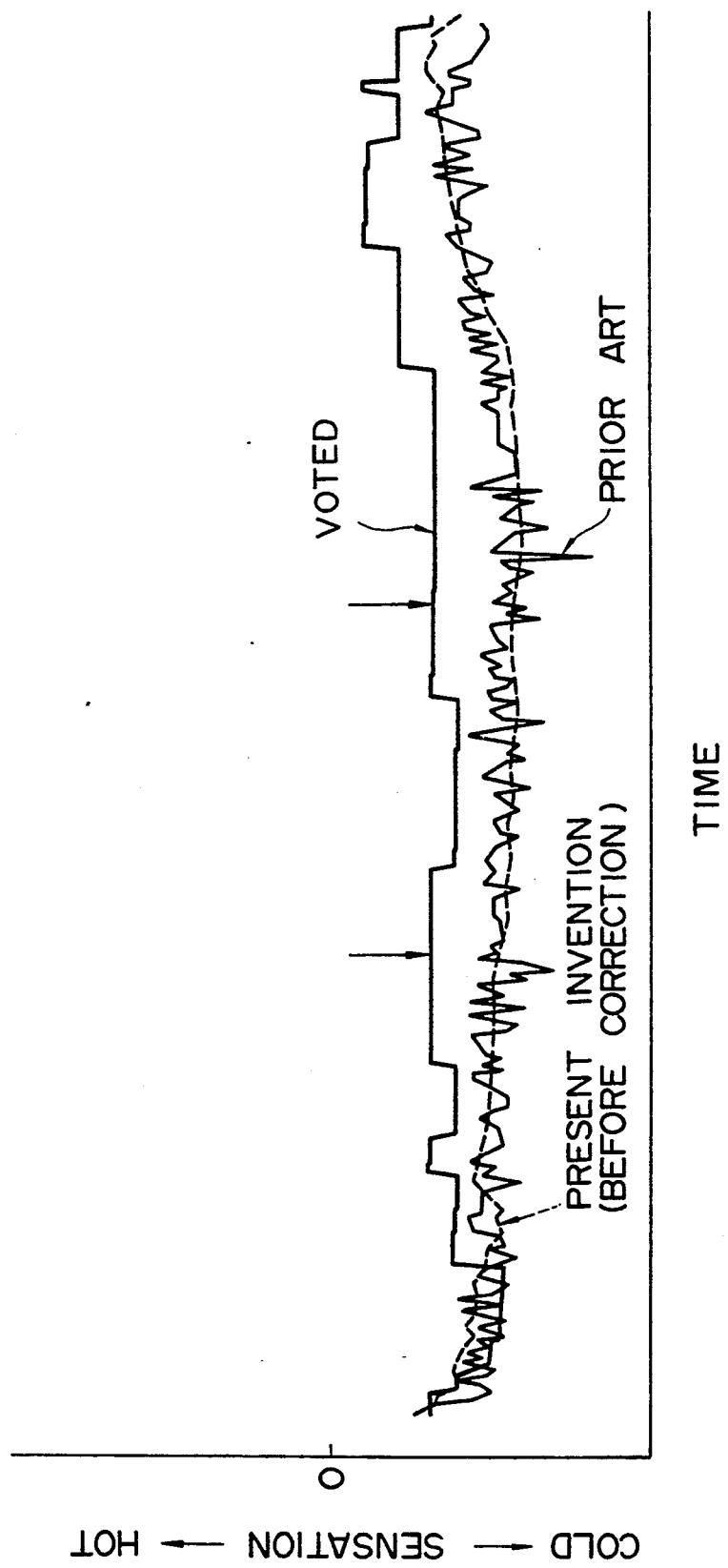
FIG. 32 is a diagram showing the results of forecast of temperature sensation, and in which the forecasted sensation is not yet corrected.
Figure 33:
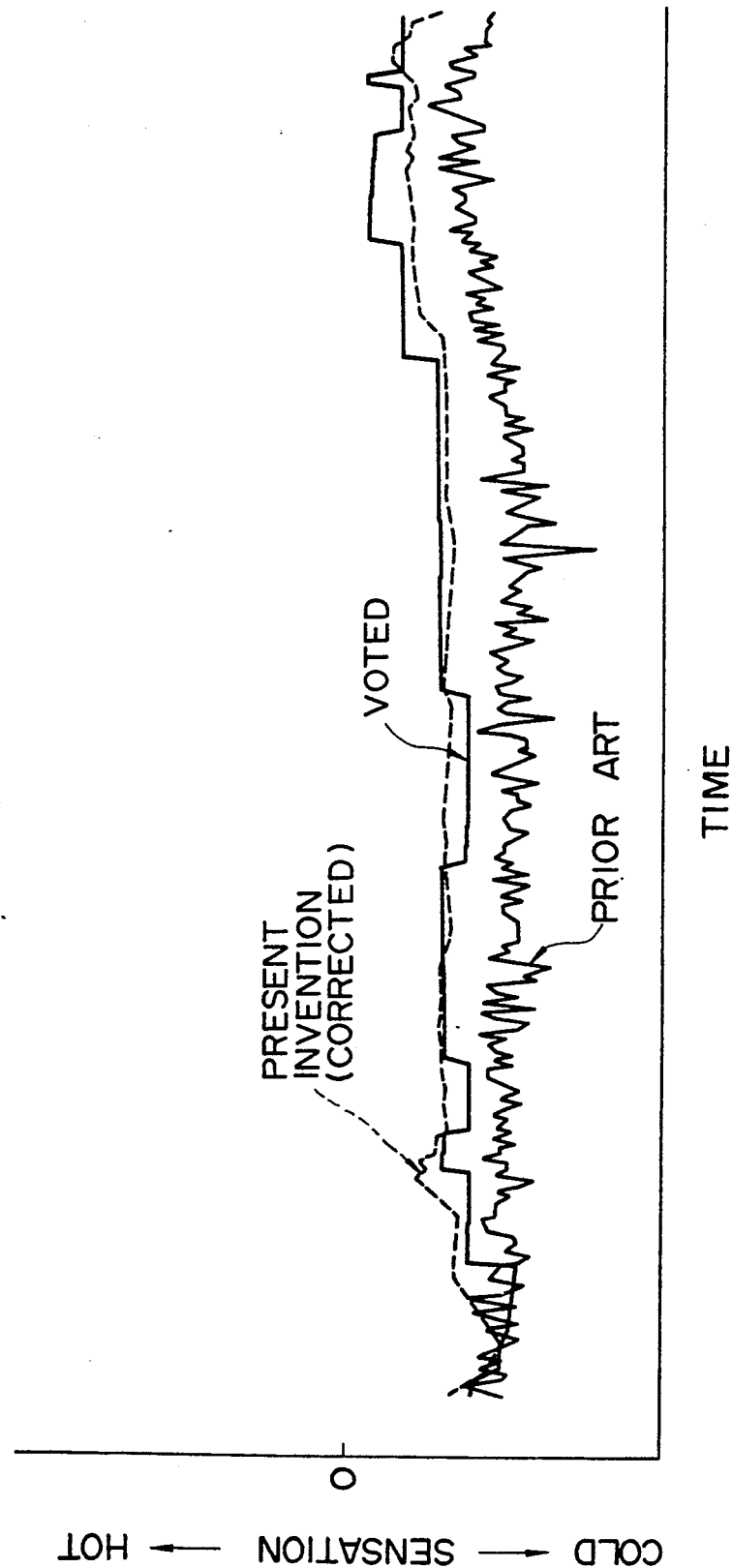
FIG. 33 is a diagram similar to FIG. 32, but in which the forecasted sensation has been corrected.

FIGS. 32 and 33 show the results of experiments performed to ascertain the effects of the improvement in the accuracy with which the temperature sensation is forecasted, the improvement being made by operating the temperature sensation operation button. When this series of experiments was started, the outside air temperature was 28° C., the temperature inside the passenger compartment was 28° C., and there was not the sun.

The graph of FIG. 32 shows the condition prior to modification. The forecasted temperature sensation deviated from the value voted by the examinee from the middle phase of the air conditioning to the latter phase, excluding the initial phase. The temperature sensation operation button was operated at the instants indicated by the arrows in FIG. 32. After the completion of this experiment, a modification was made to the temperature sensation forecasted by the temperature sensation-forecasting means 142 according to the input data from the temperature sensation operation button. The effects of the correction are shown in FIG. 33. The deviation of the forecasted temperature sensation from the voted value was corrected considerably from the middle phase of the air conditioning to the latter phase. Thus, it can be seen that the accuracy of the forecast of the temperature sensation was improved. Also, it can be seen that the accuracy is maintained after the modification if the temperature sensation has been forecasted with sufficient accuracy prior to the modification.

As described thus far, Example 6 of the invention is equipped with the temperature sensation operation button to allow the temperature sensation forecasted by the temperature sensation-forecasting means to be corrected according to the passenger's temperature sensation. Hence, the forecasted temperature sensation can be made to agree well with the passenger's temperature sensation.

Figure 24:
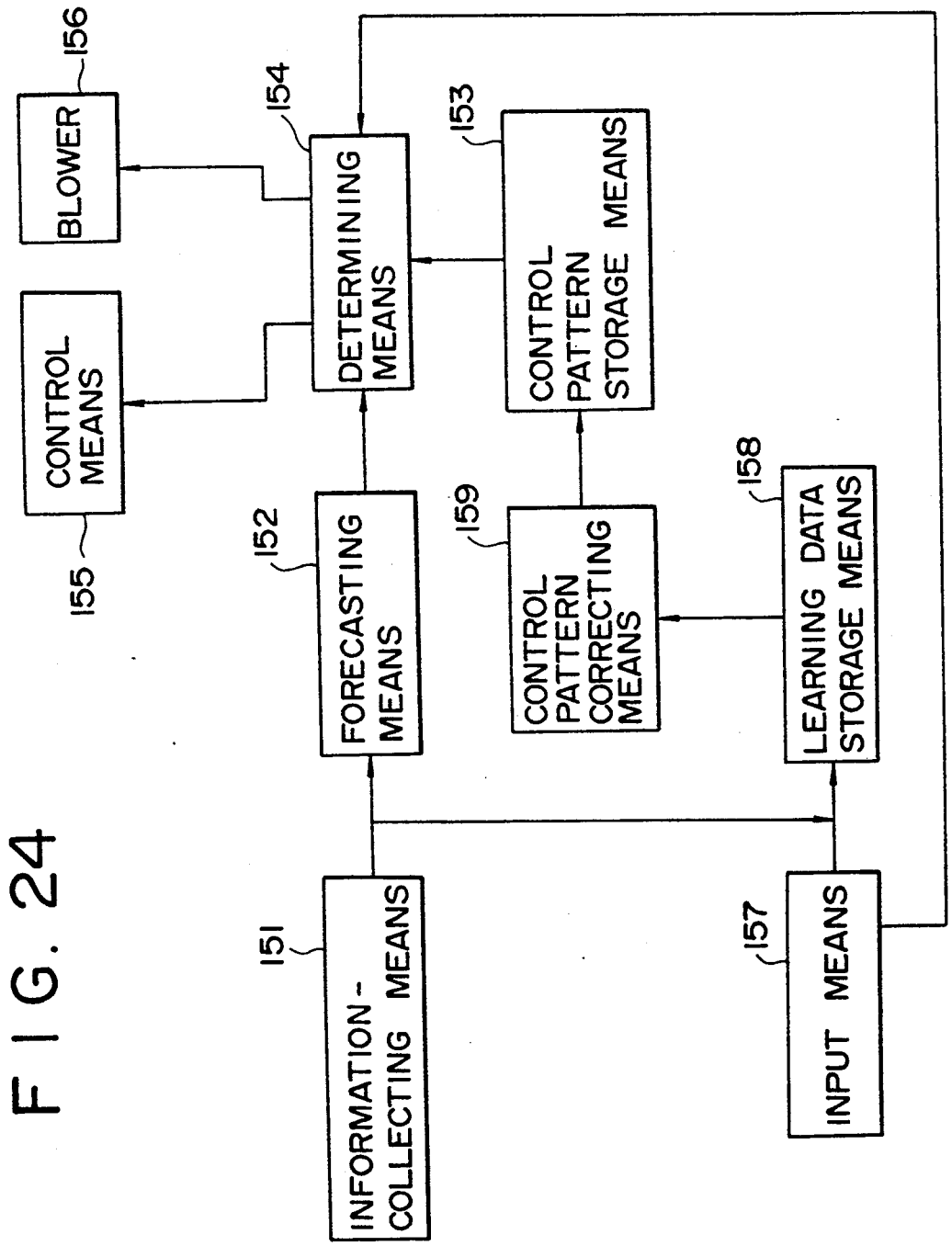
FIG. 24 is a block diagram of Example 6 of the invention.

In this example, the weights and the threshold values for the neural net forming the temperature sensation-estimating means 142 are modified according to learning data. As shown in the frame indicated by the broken line in FIG. 24, the control pattern of a control pattern storage means 153 may be modified according to the learning data. That is, no corrections are made to the weights or the threshold values for the neural net forming the temperature sensation forecasting means 152. Only the pattern of the intended temperature sensation is modified according to the signal produced by operating the temperature sensation operation button 114.

Figure 34:
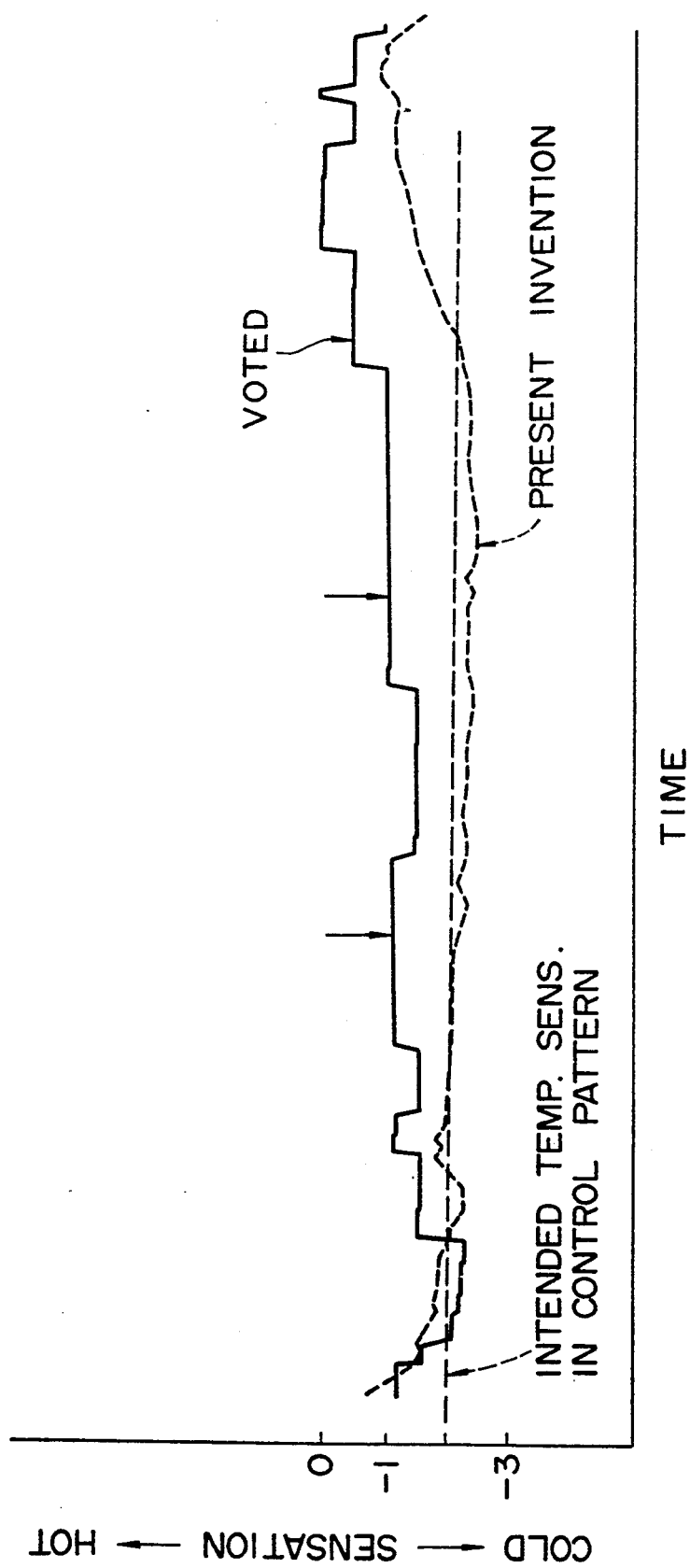
FIG. 34 is a diagram of temperature sensation, and in which the control pattern used in Example 6 is not yet corrected.
Figure 35:
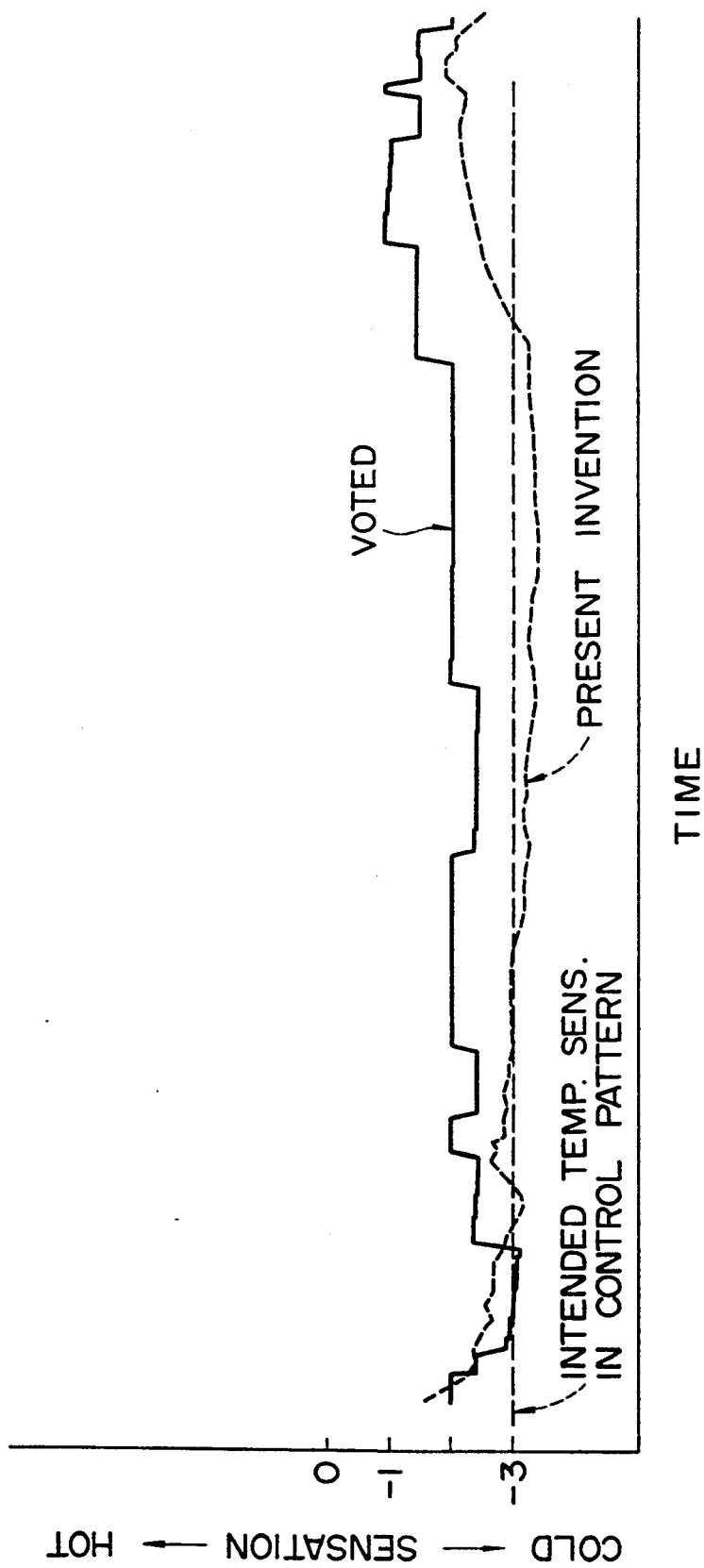
FIG. 35 is a diagram similar to FIG. 34, but in which the control pattern used in Example 6 has been already corrected.

FIGS. 34 and 35 show the results of experiments performed to ascertain the effects of the improvement in the approximation of the modified temperature sensation to the intended temperature sensation, the improvement being achieved by modifying the control pattern alone as described above. In FIG. 34, the air conditioner works in such a way that the condition of the desired temperature sensation minus 2, i.e., cool, is maintained. In this series of experiments, the value of the temperature sensation voted by the examinee was $-1$, i.e., he or she felt slightly cool. Therefore, the examinee operated the button 114 at the instants indicated by the arrows in FIG. 34 to produce a signal, for modifying the intended temperature sensation in a cooler condition.

This signal was stored in a learning data storage means 158 together with the intended temperature sensation at this instant. A control pattern-modifying means 159 calculates the difference between the temperature sensation indicated by the input signal and the intended temperature sensation according to the data stored in the storage means 158. Then, the control pattern stored in the control pattern storage means 153 is modified to thereby modify the intended temperature sensation. The results of an experiment on this scheme are shown in FIG. 35. The intended temperature sensation was adjusted to a condition of the intended temperature sensation minus 3, i.e., slightly cold. As a result, the value voted by the passenger could be maintained in a condition of the original intended temperature sensation minus 2, i.e., cool. In this way, the temperature sensation required by the passenger is entered through the temperature sensation operation button to modify the intended temperature sensation. This permits the passenger compartment to be air-conditioned appropriately according to the temperature sensation of each individual passenger.

Other methods can also be used to correct the control pattern. As described already in Example 5 in connection with FIG. 5(a), (b), (c), several control patterns have been previously stored in the control pattern storage means. The best control pattern is selected out of them according to the desire of the passenger. Furthermore, it is possible to shift the stored temperature control pattern in a warmer or colder direction according to the input signal applied by operating the temperature sensation control button 114, i.e., according to the desire of the passenger. Then, the modified pattern is employed.

This Example 6 yields the same advantages as the above-described Example 5. In addition, Example 6 is capable of modifying the weights and the threshold values for the neural net forming the temperature sensation-forecasting means or the control pattern for the intended temperature sensation according to the passenger's desire. In consequence, the passenger compartment can be air-conditioned according to the desire of each individual passenger.

EXAMPLE 7

Figure 25:
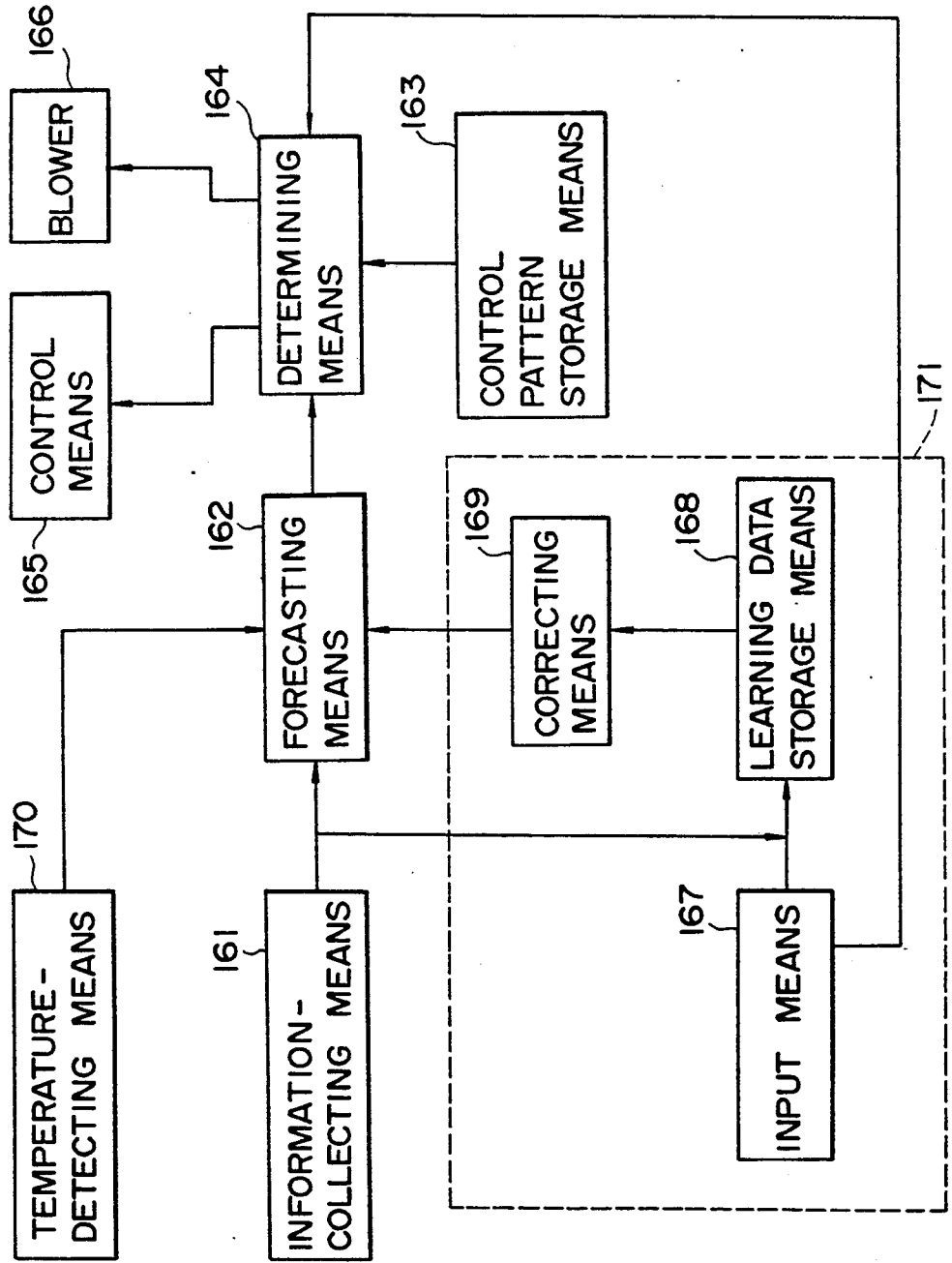
FIG. 25 is a block diagram of an air conditioner of Example 7 of the invention.
Figure 26:
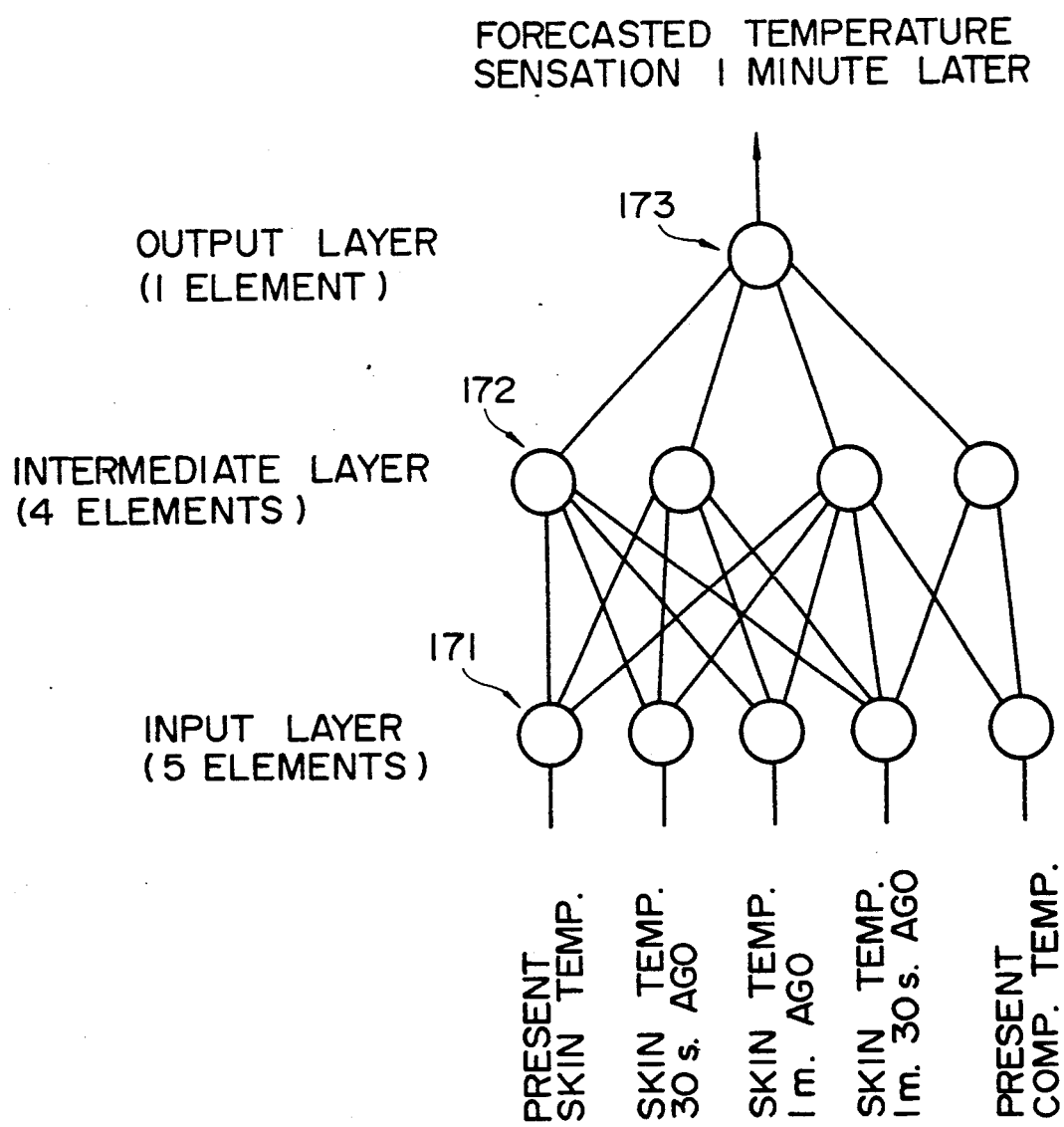
FIG. 26 is a diagram illustrating the structure of the temperature sensation-forecasting means of Example 8 of the invention.

This Example 7 is similar to Example 6 except that a passenger compartment temperature-detecting means 170 is added as shown in FIG. 25. This detecting means 170 can be the passenger compartment temperature-detecting sensor 115 (FIG. 12) installed in the center console mounted close to the driver's feet. The sensor 115 consists of a thermocouple. In this example, a signal indicating the temperature inside the passenger compartment is also applied to a temperature sensation-forecasting means 162. Therefore, the number of the elements of the input layer of the neural net forming the temperature sensation-forecasting means 162 is increased by one as compared with the number of the corresponding elements in Example 6 shown in FIG. 26. The threshold values and the weights of the couplings between the elements of the neural net are determined by previous education by the same method as used in Example 5. This educational data used as input data includes the temperature inside the passenger compartment.

This Example 7 is similar in operation to Example 6 except that the passenger compartment temperature is added to the information used in forecasting the temperature sensation to further improve the accuracy of the forecast of the temperature sensation, it being noted that in Examples 5 and 6, the temperature sensation is forecasted only according to the temperature sensation from the temperature sensation information-collecting means. In Examples 5 and 6, if a person who stayed in a relatively cold space for a long time before he or she got into the automobile in summer, and if the person then got into the automobile whose passenger compartment got hot in the sun, then there is a possibility that the forecasted temperature sensation is lower than the actual temperature sensation, since the passenger's skin temperature was low. In Example 7, however, the conditions of the surroundings of the passenger can be known, using the passenger compartment temperature-detecting sensor 115. The temperature inside the passenger compartment accommodating the passenger is used in forecasting the temperature sensation, as well as the temperature of the skin of the passenger. In this manner, the temperature sensation can be forecasted more accurately.

Figure 36:
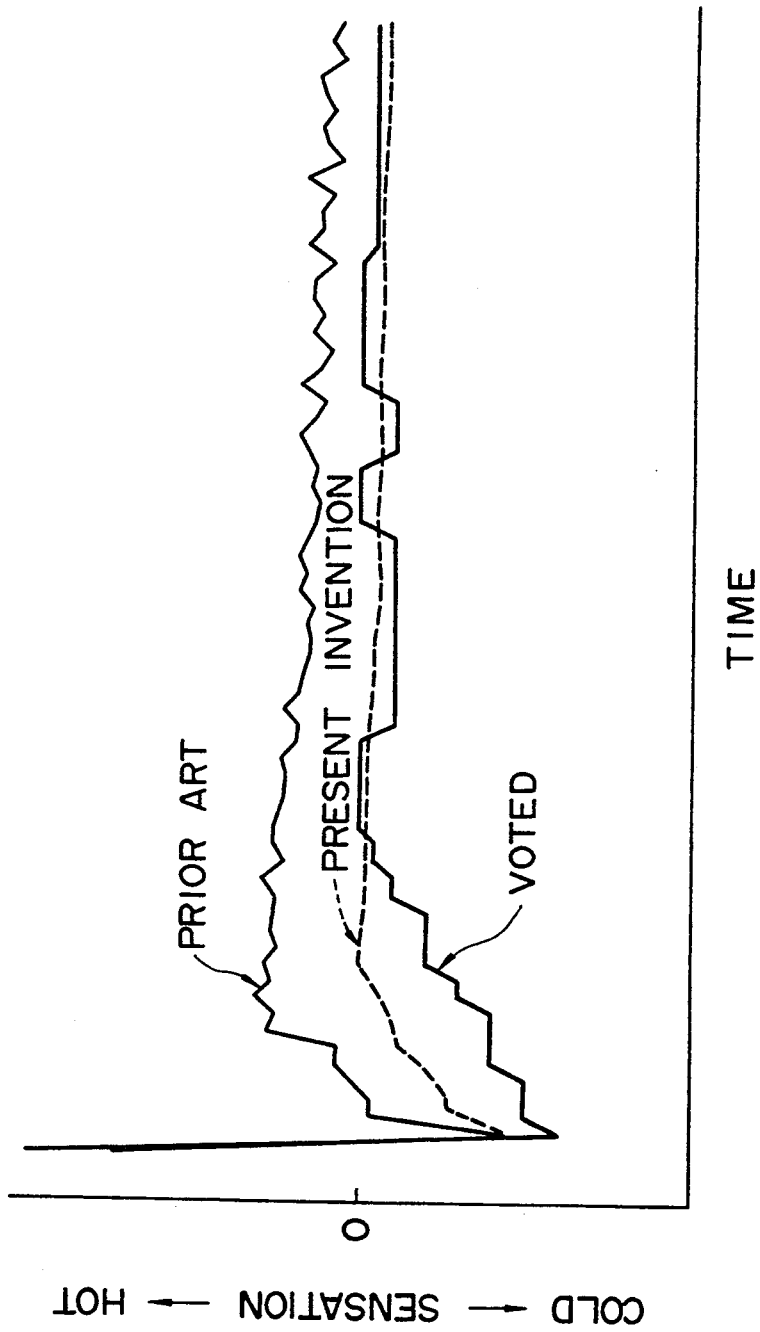
FIG. 36 is a diagram showing the results of forecast of temperature sensation made in Example 7 of the invention.

FIG. 36 shows the temperature sensation forecasted in Example 7, taking the temperature inside the passenger compartment also into account, the temperature sensation estimated by the prior art method, and the value declared by the examinee, for comparing purposes. When this series of experiments was started, the outside air temperature was 35° C., the temperature inside the passenger compartment was 60° C., and the quantity of solar radiation was 900 W/h·m². Where the temperature inside the passenger compartment was not taken into account as in Example 5, the difference between the forecasted temperature sensation and the declared value was small in and after middle phase III of the air conditioning shown in FIG. 31. Under this condition, the skin temperature varied only a little. It could not know whether heat escaped from the human body into the surrounding air or heat entered the body from the surrounding air. Also, it was impossible to estimate the exchange of heat between the passenger's skin and the surrounding air. As a result, it took a long time until the forecasted temperature sensation agreed with the voted temperature sensation after the compartment was satisfactorily air-conditioned and the skin temperature no longer changed greatly.

However, in the present Example 7, the temperature inside the passenger compartment is also taken into account. In this case, the exchange of heat between the skin and the surrounding air can be taken into consideration, unlike the case in which only the skin temperature is taken into account. Consequently, the temperature sensation can be forecasted more precisely.

In FIG. 31 where the temperature inside the passenger compartment is not taken into account, the forecasted temperature sensation slightly deviates from the actual temperature sensation in the middle phase III and in the latter phase IV of the air conditioning. In FIG. 36 where the temperature inside the passenger compartment is also considered, the deviation is corrected, and the temperature sensation is estimated with high accuracy.

As described thus far, where the temperature inside the passenger compartment is not taken into account, the accuracy of the forecast of the temperature sensation may deteriorate when the skin temperature changes only a little. Where the temperature inside the passenger compartment is also taken into consideration as in the present Example 7, the temperature sensation can be forecasted accurately even if the skin temperature no longer changes greatly.

The forecasted temperature sensation is compared with the temperature sensation control pattern stored in a control pattern storage means 163 by a correction amount-determining means 164. If the forecasted temperature sensation is shifted in a colder direction, and if the weather needs heating, then an amount of correction is transmitted to an air-conditioning control means 165 so as to increase the heater output. If the weather necessitates cooling, then the cooler output is lowered. The control means 165 varies the opening in the air mix damper 105 according to the amount of correction. The blower 102 blows a controlled amount of air into the passenger compartment 91.

Example 7 has an estimated temperature sensation-correcting means 171 similar to the estimated temperature sensation-correcting means 149 of Example 6. Therefore, the temperature sensation can be controlled according to the desire of the passenger, and more accurate air conditioning is possible.

In this way, this Example 7 of the novel air conditioner has the same advantages as Examples 5 and 6 described above. Additionally, this example can forecast the temperature sensation, taking account of the temperature inside the passenger compartment accommodating the passenger, since the signal indicating the temperature inside the passenger compartment is also applied. This enables accurate forecast of the temperature sensation. Hence, accurate air conditioning is possible.

EXAMPLE 8

Figure 27:
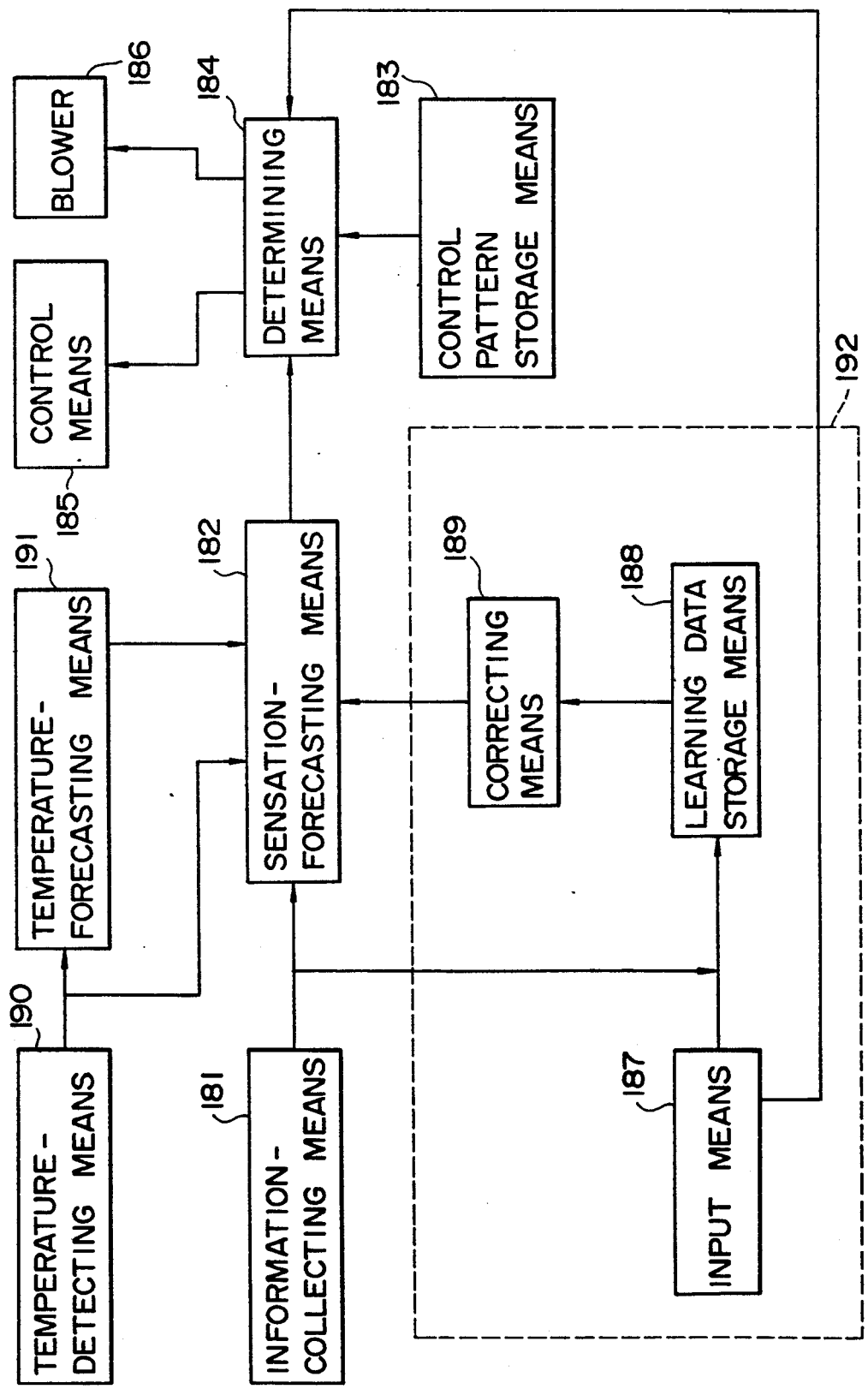
FIG. 27 is a block diagram of an air conditioner of Example 8 of the invention.

Example 8 of the invention is similar to Example 7 described above except that a passenger compartment temperature-forecasting means 191 is added as shown in FIG. 27. This forecasting means 191 forecasts near future temperature inside the passenger compartment according to the hysteresis of the passenger compartment temperature within a given period delivered from the passenger compartment temperature sensor 115 forming a passenger compartment temperature-detecting means 190. The forecasting means 191 makes use of regression analysis or comprises a neural net.

The passenger compartment temperature-forecasting means 191 receives the present and past passenger compartment temperatures detected by the passenger compartment temperature-detecting means 190 and forecasts the passenger compartment temperature which would be obtained after 1 minute later, by utilizing regression analysis or a neural net. The temperature-detecting means 190 consists of the same passenger compartment sensor as used in Example 7.

Where the temperature inside the passenger compartment is forecasted by regression analysis, which constitutes one method of forecasting the temperature inside the passenger compartment, a linear expression given by $$T = a\,t + b$$

is used for the regression analysis. In the above equation, a and b are constants, t is time, and T is the temperature inside the passenger compartment. Whenever the temperature is forecasted, the constants a and b are determined by the least squares method, using the passenger compartment temperatures measured every 30 seconds for 1 minute and 30 seconds up to now. The constants a and b determined in this way are used. The instant after one minute is applied as t. The passenger compartment temperature after 1 minute is forecasted from T.

The linear expression is used in this case. If necessary, a quadratic expression, a cubic expression, or other expression may be employed. Furthermore, the constants may be determined by a method other than the least squares method. Instead of using time t as the input variables, passenger compartment temperatures measured at regular intervals of time may be used. Then, a mathematical expression is formed. The passenger compartment temperature which would occur a given time later is found. This scheme poses no problems.

Figure 28:
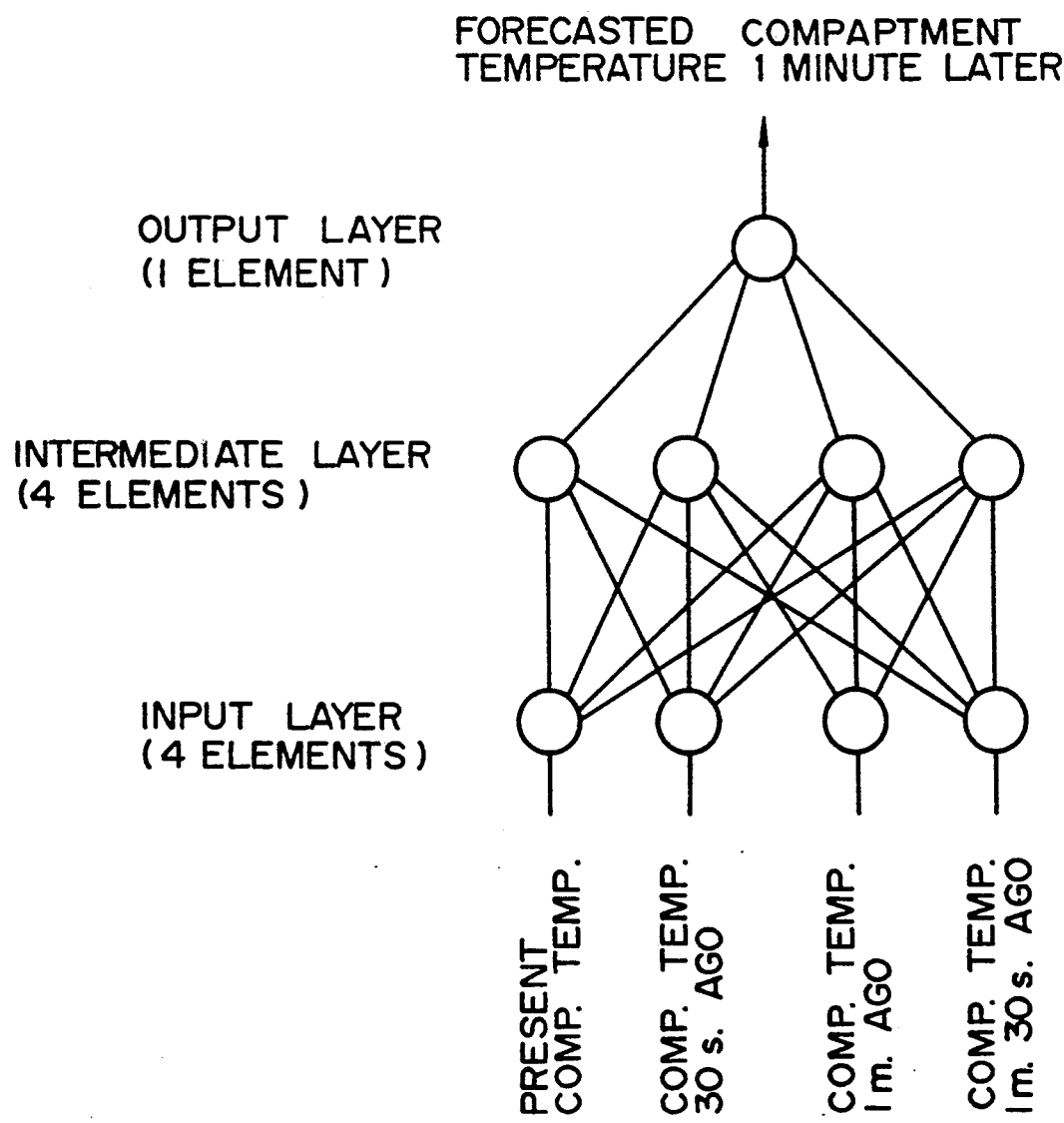
FIG. 28 is a diagram of the passenger compartment temperature-forecasting means of Example 8 of the invention.

Another method of forecasting the temperature inside the passenger compartment is next described by referring to FIG. 28, where a neural net is used as the passenger compartment temperature-forecasting means 191. The hysteresis of the passenger compartment temperature taken every 30 seconds for 1 minute and 30 seconds up to now is applied to forecast the passenger compartment temperature which would take place one minute later. The weights of the couplings between the elements of the neural net and the threshold values for the elements are set by the same method as used in Example 1 according to empirical data obtained previously from the input hysteresis of the passenger compartment temperature and from the future, or 1 minute later, passenger compartment temperature.

Figure 29:
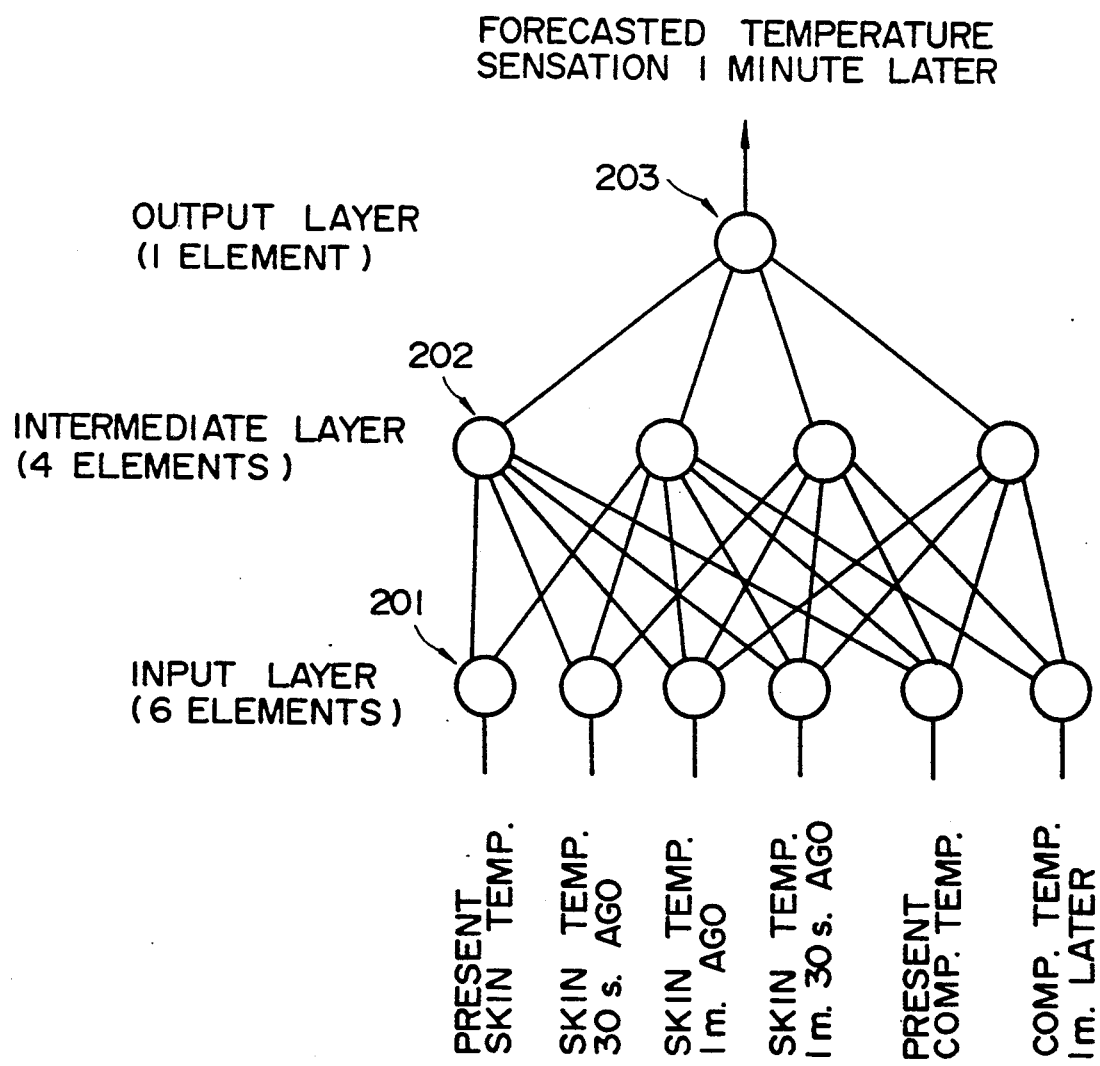
FIG. 29 is a diagram of the temperature sensation-forecasting means of Example 8 of the invention.

The neural net forming a temperature sensation-forecasting means 182 is shown particularly in FIG. 29. This net is similar to the neural net used in Example 7 except that the number of the elements of the input layer is increased by one, because the number of the data items applied to the input layer 201 is increased by one, corresponding to the passenger compartment temperature occurring one minute later. The output layer 203 produces a value corresponding to the future temperature sensation which is determined, taking account of the present passenger compartment temperature and the passenger compartment temperature occurring one minute later.

The threshold values for the elements of this temperature sensation-forecasting means and the weights of the couplings between the elements have been determined by previous education by the same method as used in Example 5 above. The educational data includes forecasted passenger compartment temperature that is used as input data.

This Example 8 is similar in operation to Example 7 except that information about the future passenger compartment temperature forecasted according to the hysteresis of the passenger compartment temperature is also applied. In Example 7, future temperature sensation is forecasted according to information about the temperature sensation and information about the temperature inside the passenger compartment.

The temperature of the passenger's skin is detected by the infrared thermometer 116 forming a temperature sensation information-collecting means 181. The present temperature inside the passenger compartment is detected by the passenger compartment temperature sensor 115 forming a passenger compartment temperature-detecting means 190. These temperatures are applied to a temperature sensation-forecasting means 182, as well as the one-minute later passenger compartment temperature forecasted by the passenger compartment temperature-forecasting means 191.

In actual air conditioning, the infrared thermometer 116 forming the temperature sensation information-collecting means 181 detects the temperature of the passenger's skin. The passenger compartment temperature sensor 115 forming the passenger compartment temperature-detecting means 190 detects the temperature inside the passenger compartment. The passenger compartment temperature-forecasting means 191 forecasts the 1-minute later passenger compartment temperature according to the passenger compartment temperature detected by the passenger compartment temperature-detecting means 190.

As shown in FIG. 29, the present skin temperature, the skin temperatures measured previously, the present passenger compartment temperature, and near future (one minute later), or forecasted, passenger compartment temperature are applied to the input layer 201 of the temperature sensation-forecasting means 182, which forecasts the temperature sensation occurring near future, or one minute later, according to the input data.

Figure 37:
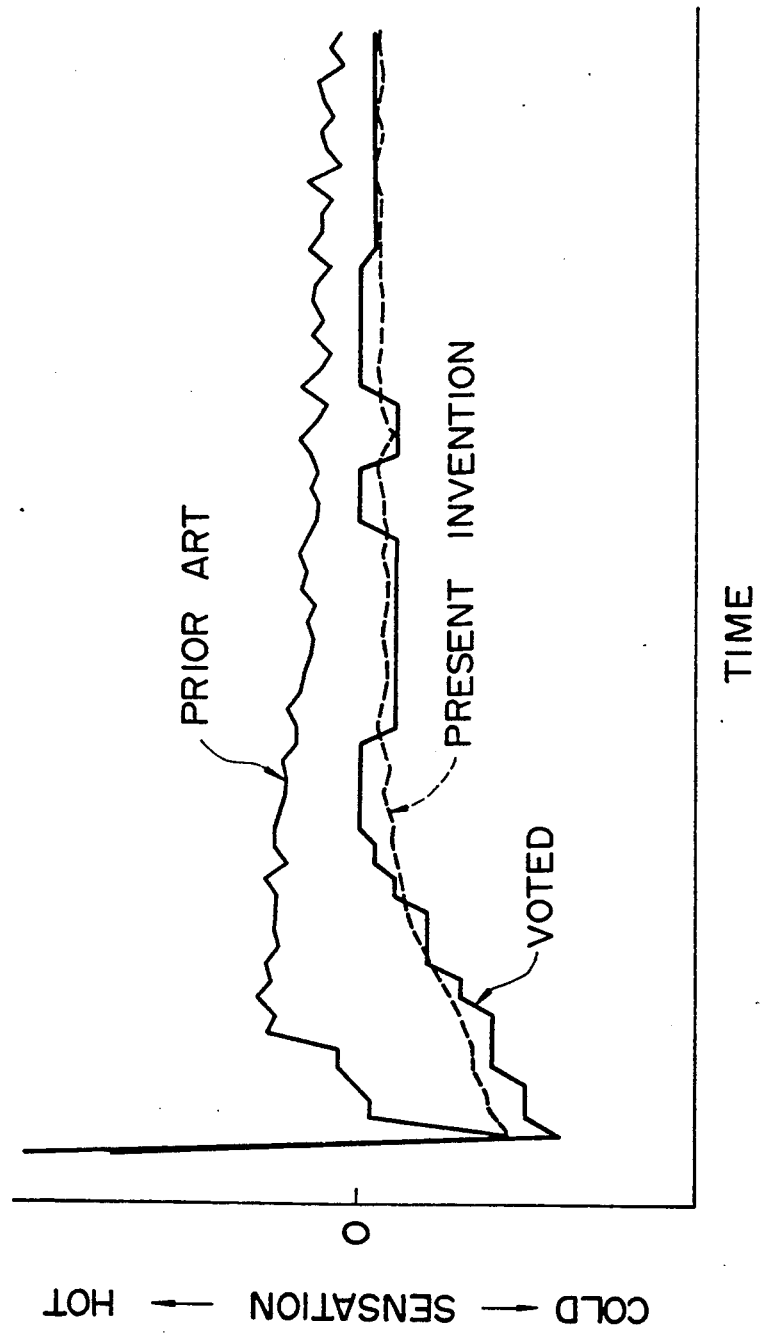
FIG. 37 is a diagram showing the results of forecast of temperature sensation made in Example 8 of the invention.

FIG. 37 shows the temperature sensation forecasted, taking also the hysteresis of the passenger compartment temperature into account, in accordance with Example 8, the temperature sensation estimated by the prior art method, and the value voted by the examinee, for comparing purposes. This series of experiments was started when the outside air temperature was 35° C., the passenger compartment temperature was 60° C., and the quantity of solar radiation was 900 W/h·m².

In the above Example 7, only the present temperature in the passenger compartment was entered. The hysteresis of the temperature is not taken into account. When the skin temperature and the passenger compartment temperature vary greatly as encountered at the beginning of air conditioning as shown in FIG. 36, future temperature sensation cannot be sufficiently forecasted, because it is impossible to know whether the temperature inside the passenger compartment is on the upward trend or on the downward trend.

In the present Example 8, since the hysteresis of the temperature inside the passenger compartment is also treated an input data, the temperature sensation can be accurately forecasted by forecasting changes in the temperature inside the passenger compartment and taking account of the forecasted passenger compartment temperature. Furthermore, even at the beginning of the air conditioning when the skin temperature and the passenger compartment change especially violently, the temperature sensation can be forecasted accurately as shown in FIG. 37.

As described thus far, in the present Example 8, since the hysteresis of the passenger compartment temperature is taken into consideration, the accuracy of the forecast of the temperature sensation can be improved even if the skin temperature and the passenger compartment temperature vary quickly.

A correction amount-determining means 184 compares the forecasted temperature sensation with the temperature sensation control pattern stored in a control pattern storage means 183. If the forecasted temperature sensation is shifted in a colder direction, and if the weather needs heating, then an amount of correction is transmitted to an air-conditioning control means 185 to increase the heater output. If the weather needs cooling, the cooler output is decreased. The air-conditioning control means 185 varies the opening in the air mix damper 105 and the temperature set by the evaporator 103 and the heater core 104 and adjusts the temperature of the wind according to this amount of correction. The blower 102 adjusts the wind speed also according to the amount of correction. In this way, the passenger compartment 91 is air-conditioned.

Therefore, in the present Example 8, the temperature sensation can be forecasted from the difference between the present passenger compartment temperature and the past passenger compartment temperature, taking the present trend of the passenger compartment temperature into account, i.e., depending on whether the temperature is on the upward trend or on the downward trend. Also in the present Example 8, the passenger compartment temperature forecasted from the hysteresis of the temperature inside the passenger compartment can be used. This permits more accurate forecast of the temperature sensation. As a result, the compartment can be air-conditioned more precisely.

Figure 30:
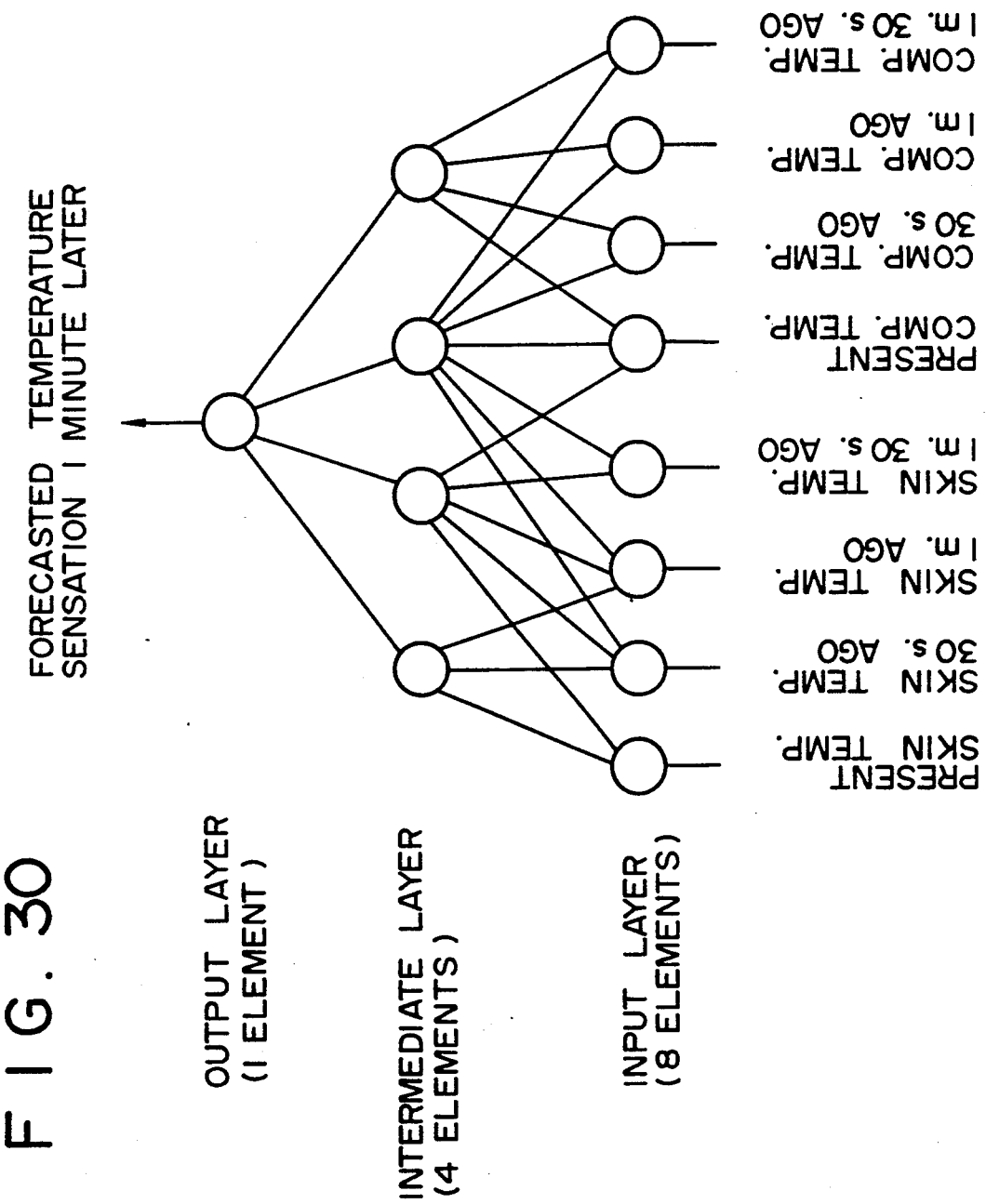
FIG. 30 is a diagram of a modification of the temperature sensation-forecasting means of Example 8 of the invention.

The passenger compartment temperature-forecasting means 191 can be included in the temperature sensation-forecasting means 182. In this case, as shown in FIG. 30, the hysteresis of the temperature of the passenger's skin measured every 30 seconds for 1 minute and 30 seconds up to now is applied. Also, the hysteresis of the temperature of the passenger compartment accommodating the passenger is applied.

As shown in FIG. 27, a temperature sensation-forecasting portion 192 similar to the temperature sensation-correcting means 149 of Example 6 can, of course, be added to the present Example 8.

Example 8 yields the same advantages as Examples 5–7 described above. In addition, it is possible to know whether the present temperature inside the passenger compartment is on the upward trend or on the downward trend by utilizing the forecasted temperature inside the passenger compartment. Therefore, the temperature sensation can be forecasted with higher accuracy than in Example 7 where the temperature sensation is forecasted only from the present temperature inside the passenger compartment and the temperature of the skin. Thus, quick and precise air conditioning can be realized.

OTHER MODIFIED EXAMPLES

In the above-described Examples 1–8, an infrared thermometer is used as the temperature sensation information-collecting means to detect the temperature of the passenger's skin. The information regarding the temperature sensation can include brain waves, sphygmus, and the electric potential on the skin. Moreover, a sensor or model producing signals equivalent to the signals produced from the human body may be used. That is, instead of directly collecting information about the temperature sensation of the human body, the signals from the sensor or model are used as information concerning the temperature sensation.

In the above examples, the temperature inside the passenger compartment is detected by the passenger compartment temperature-detecting means. In order to forecast the temperature sensation more accurately, a humidity sensor (not shown) may be installed close to the passenger compartment temperature sensor 115 shown in FIG. 12 if necessary. A signal indicating the humidity inside the passenger compartment is applied from the humidity sensor. The solar radiation quantity sensor 113 mounted on the dashboard produces a signal indicating the quantity of solar radiation, and this signal is also applied. A temperature sensor (not shown) installed on the ceiling produces a signal indicating the environment such as the temperature inside the passenger compartment, the signal being also applied to the air conditioner. The sensor 112 acting as an outside air temperature sensor and also as an outside air humidity sensor is mounted in a duct located at the front end of the vehicle. This sensor produces a signal indicating the temperature of the outside air and a signal indicating the humidity of the outside air. These signals are also supplied to the air conditioner.

In Examples 1–8 described above, the information about the temperature sensation is collected only from one point. Also, the temperature inside the passenger compartment is measured only at one point. Alternatively, the temperature sensation can be forecasted from the information collected from a plurality of points. Obviously, in this case, the number of the input elements and the number of the intermediate elements of the temperature sensation-forecasting means are varied, depending on the number of the input signals.

WHAT IS CLAIMED IS:

1. An air conditioner comprising:
   temperature sensation information-collecting means for collecting information about a temperature sensation of a person inside a room or compartment;
   temperature sensation-estimating means for estimating a temperature sensation from the hysteresis of the information provided by the temperature sensation information-collecting means within a given period;
   control pattern storage means in which a predetermined control pattern for reaching a desired temperature sensation is stored;
   correction amount-determining means for determining amount of corrections of the flow rate and the temperature of air blown into the room or compartment in such a way that the control pattern stored in the control pattern storage means agrees with the temperature sensation estimated by the temperature sensation-estimating means;
   conditioning air temperature control means for controlling a temperature of the air blown into the room or compartment according to the output signal from the correction amount-determining means; and
   a blower for controlling the flow rate of the air blown into the room or compartment according to the output signal from the correction amount-determining means.

2. The air conditioner of claim 1, further comprising desired temperature sensation input means for inputting a person's desired temperature sensation, thereby correcting said amount of corrections according to the desired temperature sensation.

3. The air conditioner of claim 1, further comprising room or compartment temperature-detecting means for detecting the temperature of the air inside the room or compartment, thereby estimating the temperature sensation from the temperature inside the room or compartment and from the hysteresis of the information about the temperature sensation within a given period.

4. The air conditioner of claim 1, wherein the temperature sensation-estimating means estimates the present temperature sensation from the hysteresis of information about the temperature sensation within a given period.

5. The air conditioner of claim 4, further comprising desired temperature sensation input means for inputting a person's desired temperature sensation, thereby correcting said amounts of corrections according to the desired temperature sensation.

6. The air conditioner of claim 5, further comprising temperature sensation-correcting means for correcting the temperature sensation estimated by the temperature sensation-estimating means, according to the desired temperature sensation.

7. The air conditioner of claim 6, further comprising room or compartment temperature-detecting means for detecting the temperature of the air inside the room or compartment, thereby estimating the present temperature sensation from the temperature inside the room or compartment and from the hysteresis of the information about the temperature sensation within a given period.

8. The air conditioner of claim 5, further comprising control pattern-correcting means for controlling said control pattern according to the desired temperature sensation.

9. The air conditioner of claim 8, further comprising room or compartment temperature-detecting means for detecting the temperature of the air inside the room or compartment, thereby estimating the present temperature sensation from the temperature inside the room or compartment and from the hysteresis of the information about the temperature sensation within a given period.

10. The air conditioner of claim 1, wherein the temperature sensation-estimating means forecasts and estimates future temperature sensation from the hysteresis of information about the temperature sensation within a given period.

11. The air conditioner of claim 10, further comprising desired temperature sensation input means for inputting a person's desired temperature sensation, thereby correcting said amounts of corrections according to the desired temperature sensation.

12. The air conditioner of claim 11, further comprising estimated temperature sensation-correcting means for correcting the temperature sensation estimated by the temperature sensation-estimating means, according to the desired temperature sensation.

13. The air conditioner of claim 12, further comprising room or compartment temperature-detecting means for detecting the temperature of the air inside the room or compartment, thereby forecasting and estimating the temperature sensation from the temperature inside the room or compartment and from the hysteresis of the information about the temperature sensation within a given period.

14. The air conditioner of claim 11, further comprising control pattern-correcting means for controlling said control pattern according to the desired temperature sensation.

15. The air conditioner of claim 14, further comprising room or compartment temperature-detecting means for detecting the temperature of the air inside the room or compartment, thereby forecasting and estimating the future temperature sensation from the temperature inside the room or compartment and from the hysteresis of the information about the temperature sensation within a given period.

16. The air conditioner of claim 10, further comprising room or compartment temperature-detecting means for detecting the temperature of the air inside the room or compartment, thereby forecasting and estimating the future temperature sensation from the temperature inside the room or compartment and from the hysteresis of the information about the temperature sensation within a given period.

17. The air conditioner of claim 16, wherein the temperature sensation-estimating means forecasts and estimates the future temperature sensation from the present temperature inside the room or compartment and from the hysteresis of the information about the temperature sensation within a given period.

18. The air conditioner of claim 16, further comprising desired temperature sensation input means for inputting a person's desired temperature sensation and estimated temperature sensation-correcting means for correcting the temperature sensation estimated by the temperature sensation-estimating means according to the desired temperature sensation, thereby forecasting and estimating the future temperature sensation from the hysteresis of the temperature inside the room or compartment within a given period and from the hysteresis of the information about the temperature sensation within a given period.

19. The air conditioner of claim 16, further comprising desired temperature sensation input means for inputting a person's desired temperature sensation and a control pattern-correcting means for correcting the control pattern according to the desired temperature sensation, thereby forecasting and estimating the future temperature sensation from the hysteresis of the temperature inside the room or compartment within a given period and from the hysteresis of the information about the temperature sensation within a given period.

20. The air conditioner of claim 8, further comprising room or compartment temperature-forecasting means for forecasting future temperature inside the room or compartment according to the hysteresis of the temperature inside the room or compartment within a given period, thereby forecasting and estimating the future temperature sensation from the forecasted temperature inside the room or compartment and from the hysteresis of the information about the temperature sensation within a given period.

* * * * *